United States Patent [19]

Rohn et al.

[11] Patent Number: 4,742,443

[45] Date of Patent: May 3, 1988

[54] PROGRAMMABLE CONTROLLER WITH FUNCTION CHART INTERPRETER

[75] Inventors: David R. Rohn, Richmond Heights; Terry L. Dauterman, Chardon; Ronald E. Schultz, Willoughby, all of Ohio

[73] Assignee: Allen-Bradley Company, Milwaukee, Wis.

[21] Appl. No.: 717,221

[22] Filed: Mar. 28, 1985

[51] Int. Cl.[4] .......................................... G05B 19/00
[52] U.S. Cl. ................................................ 364/136
[58] Field of Search ................ 364/200, 900, 136, 134

[56] References Cited

U.S. PATENT DOCUMENTS

| | | | |
|---|---|---|---|
| 3,810,104 | 5/1974 | Markley | 340/172.5 |
| 4,038,533 | 7/1977 | Dummermuth et al. | 235/151.11 |
| 4,149,235 | 4/1979 | Froyd | 364/900 |
| 4,162,536 | 7/1979 | Morley | 364/900 |
| 4,228,495 | 10/1980 | Bernhard et al. | 364/101 |

OTHER PUBLICATIONS

Draft of Approved French Standard—Sep., 1981.
International Electrotechnical Commission—Preparation of Function Charts for Control Systems—Jan., 1982.
International Electrotechnical Commission—Standard for Programmable Controllers—Part 3: Programming Languages—Nov. 1984.
"Programmable Controller Functions are Enhanced by Structural Programming", Control Engineering, Feb., 1984.
"A Program Development Tool for the Entire Automation Staff", published by Siemens, date unknown.
"Controller Combines Computer and Programmable Control Functions", Control Engineering, Nov. 1984.
"Data PCs From Maxitron—Conceptual and Technical Perspectives", brochure published in 1985.

Primary Examiner—Gareth D. Shaw
Assistant Examiner—John G. Mills
Attorney, Agent, or Firm—Quarles & Brady

[57] ABSTRACT

A programmable controller stores a user control program which is comprised of a plurality of conventional ladder programs and a structure chart program. A microprocessor executes a structure chart interpreter routine to interpret the structure chart program and to thereby create an active state list which indicates the ladder programs that are to be executed. The same microprocessor with the assistance of a bit processor also executes the ladder programs which are indicated on the active state list to control a machine connected to the programmable controller.

9 Claims, 23 Drawing Sheets

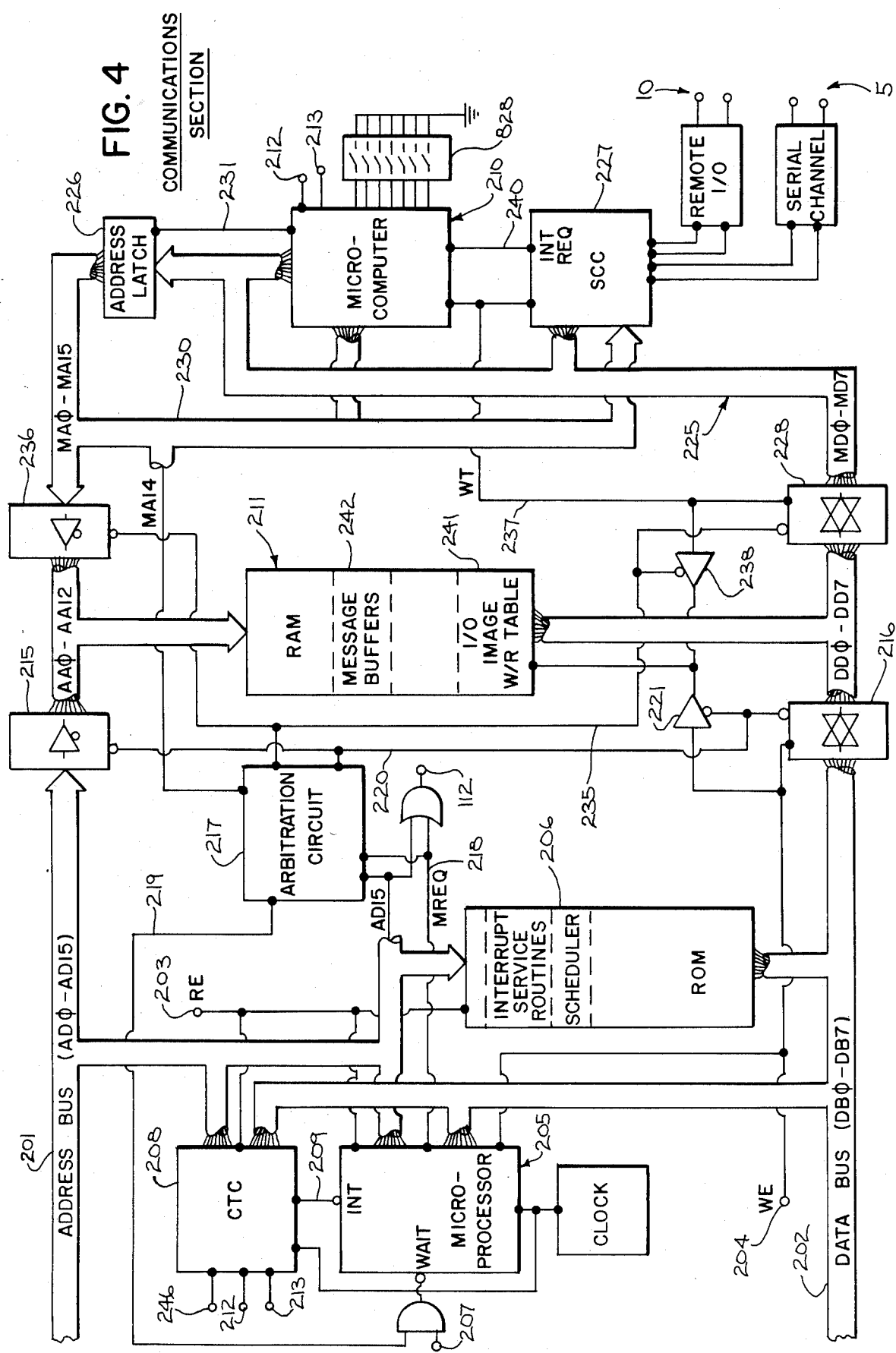

PROGRAM FILE POINTER

DATA TABLE POINTER

STATUS DATA FILE

STRUCTURE CHART INTERPRETER

ACTIVE STATE LIST

STRUCTURE CHART DEFINITION

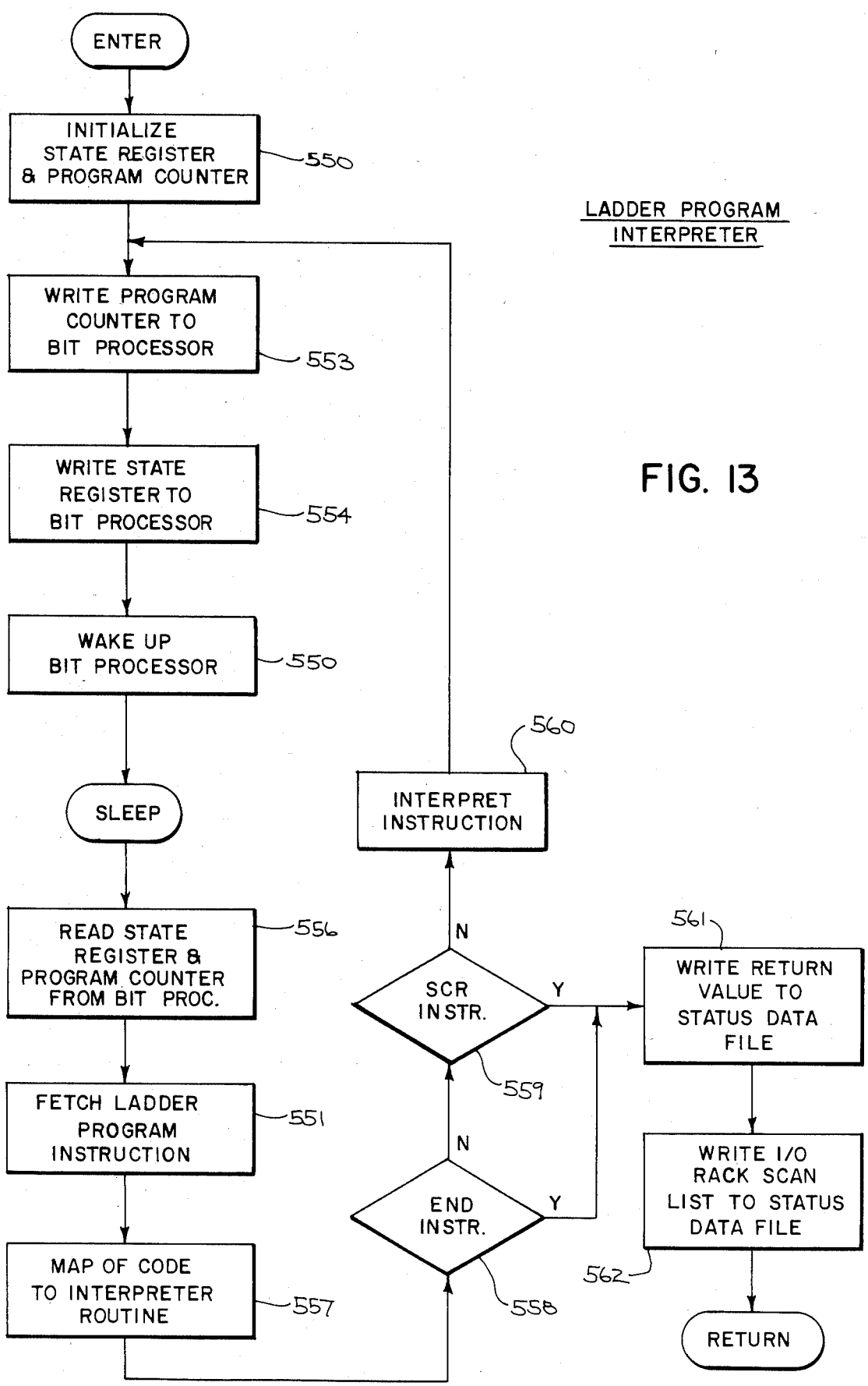

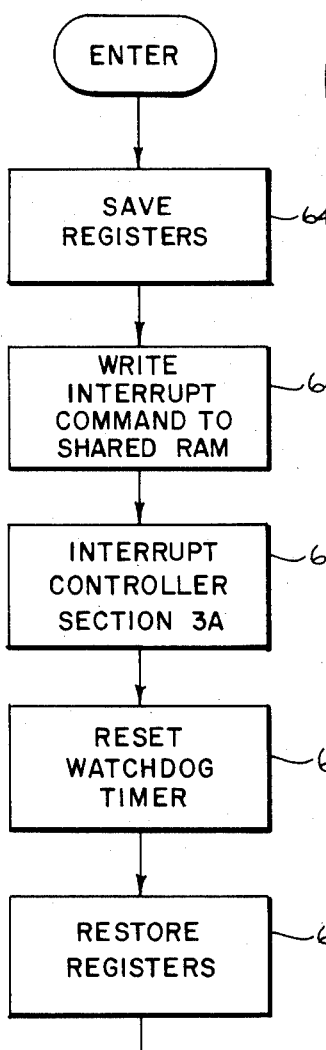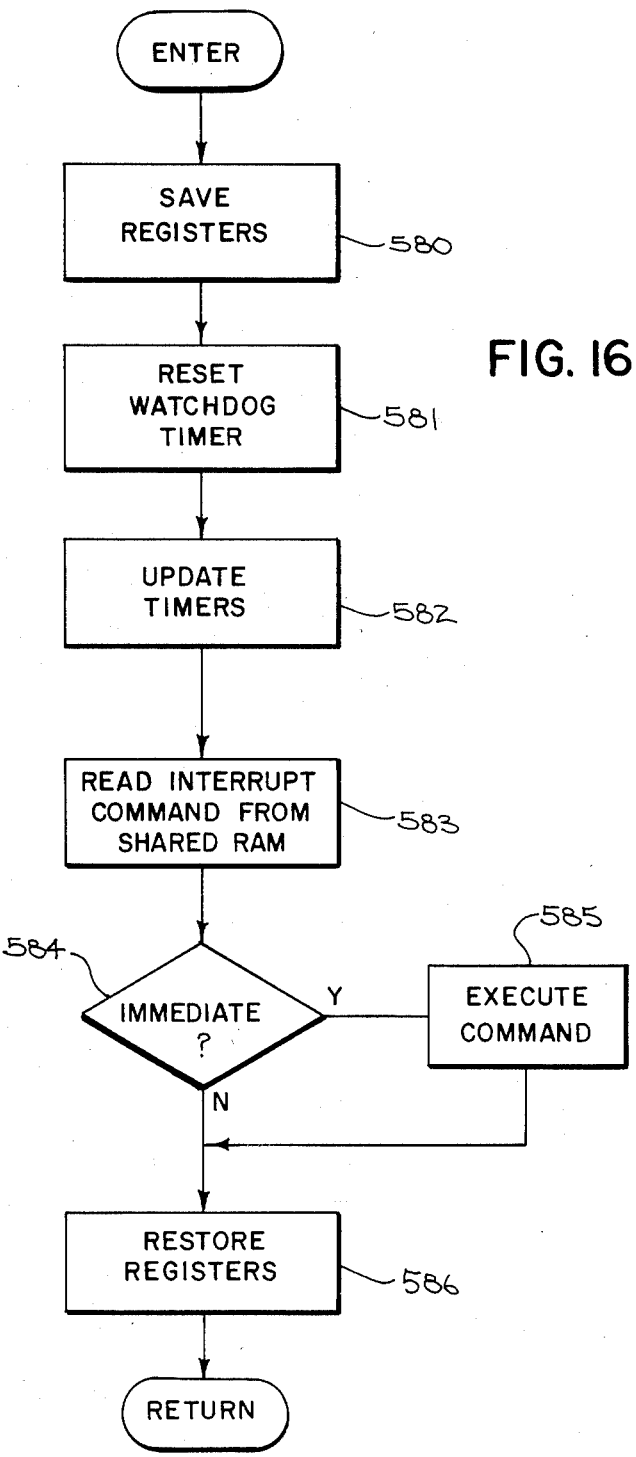
FIG. 18
FIG. 16

FIG. 25

| DESCRIPTOR NUMBER | SYMBOLIC NAME | STRUCTURE CHART DEFINITION |
|---|---|---|
| 0 | START | 01 \| 10 \| FILE #32<br>DESCRIPTOR #1<br>DESCRIPTOR #2<br>DON'T CARE |
| 1 | WEIGH DRY MATERIALS | 00 \| 10 \| FILE #34<br>DESCRIPTOR #3<br>DESCRIPTOR #4 |
| 2 | WASH MIXER | 00 \| 01 \| FILE #65<br>DESCRIPTOR #6 |
| 3 | DUMP DRY MATERIALS | 10 \| 10 \| FILE #24<br>DESCRIPTOR #4<br>DESCRIPTOR #5    ~504 |
| 4 | DISPENSE LIQUID | 10 \| 10 \| FILE #39<br>DESCRIPTOR #3<br>DESCRIPTOR #5 |
| 5 | MIX PRODUCT | 00 \| 01 \| FILE #7<br>DESCRIPTOR #6 |
| 6 | EMPTY MIXER | 00 \| 01 \| FILE #12<br>DESCRIPTOR #0 |

PROGRAMMABLE CONTROLLER WITH FUNCTION CHART INTERPRETER

BACKGROUND OF THE INVENTION

The field of the invention is programmable controllers such as those described in U.S. Pat. Nos. 3,810,118; 3,942,158; 4,165,534; and 4,442,504.

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence and executed to examine the condition of selected sensing devices on the controlled equipment, or to energize or deenergize selected operating devices on the controlled equipment contingent upon the status of one or more of the examined sensing devices.

The processor in a programmable controller is designed to rapidly execute programmable controller type instructions which in medium to large sized controllers includes not only instructions that manipulate single-bit input and output data, but also arithmetic instructions, file handling instructions, timers and counters, sequencers and other, more complex instructions. To insure that the programmable controller can respond quickly to change in the status of sensing devices on the controlled system, it is imperative that the controller execute th control program repeatedly at a very high rate. The rate at which a programmable controller can execute the instructions in its instruction set, as well as the size of the control program, are the primary factors which determine the rate at which the programmable controller can repeatedly execute, or "scan", the control program.

A programmable controller processor is expected to execute certain well-known programmable controller type instructions. Such instructions have become quite standardized in the industry and they may be directly associated with elements of a ladder diagram which is easily understood by control engineers. Program panels such as those disclosed in U.S. Pat. Nos. 3,798,612 and 3,813,649 and in 4,070,702 have been developed to assist the user in developing and editing ladder diagram type control programs comprised of such programmable controller instructions.

While ladder diagram control programs are particularly easy to create and edit for relativly small to medium scale control tasks, they become cumbersome and ineffecient to use in large control tasks. Large ladder diagram control programs are difficult to understand, difficult to trouble shoot, and require a long time to execute.

SUMMARY OF THE INVENTION

The present invention relates to a processor for a programmable controller which stores a plurality of separate ladder control programs that are logically related to each other by a stored structure chart program, and the processor is operable to execute the stored structure chart program which directs which ones of the stored ladder programs are to be repeatedly executed by the processor at any point in time.

A general object of the invention is to simplify the task of programming and supporting large control tasks. It has been discovered that large control tasks can usually be broken down into separate control steps which are executed in a sequential order as the controlled machine or process advances through its states. Each control step is defined by a separately executable ladder program which is easy to understand and which may be executed at a very high scan rate. The sequence in which the separate control steps are executed is defined by the structure chart program which is a general expression of how the controlled machine or process is to operate. The user may thus define the general manner in which the machine or process is to operate using structure chart constructs, and then define the detailed operation of the machine or process in separate, easily managed ladder programs.

Another general object of the invention is to improve the rate at which the processor can execute the user's control program. This is accomplished in part by separating the control program into separately executable ladder programs and only executing those which are necessary at any moment in time. Thus, rather than executing a single large ladder program, one or more smaller ladder programs are executed at a much higher scan rate.

A more specific object of the invention is to improve the rate at which the processor executes a ladder program. This is accomplished by a bit processor which is operable to execute a selected sub set of bit-oriented instructions at a very high rate, and a programmed microprocessor which stands by to execute those other instructions in the ladder program instruction set which cannot be executed by the bit processor. In contrast to prior processors which employ hardwired bit processor circuits to assist programmed microprocessors, the bit processor of the present invention will continue to execute control instructions until it encounters one which it cannot execute. Only then will it initiate the transfer of control back to the microprocessor. Since statistical studies have shown that 75% to 95% of actual ladder programs are comprised of the single-bit instructions which are executable by the bit processor, allowing the bit processor to retain control substantially improves scan rate in most situations.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 4 is an electrical schematic diagram of a communications section of the processor module of FIG. 1A;

FIG. 13 is a flowchart of a ladder program interpreter routine which forms part of the program of FIG. 10;

FIG. 16 is a flowchart of a ten millisecond interrupt service routine executed by the control section of FIG. 2;

FIG. 18 is a flowchart of a ten millisecond interrupt service routine executed by the microprocessor in the communications section of FIG. 4;

FIG. 25 is a schematic representation of a structure chart program for the example machine of FIG. 23; and FIG. 25 is a schematic representation of the stored structure chart program which corresponds to the representation in FIG. 24.

DESCRIPTION OF THE PREFERRED EMBODIMENT

Figures 1, 1A:
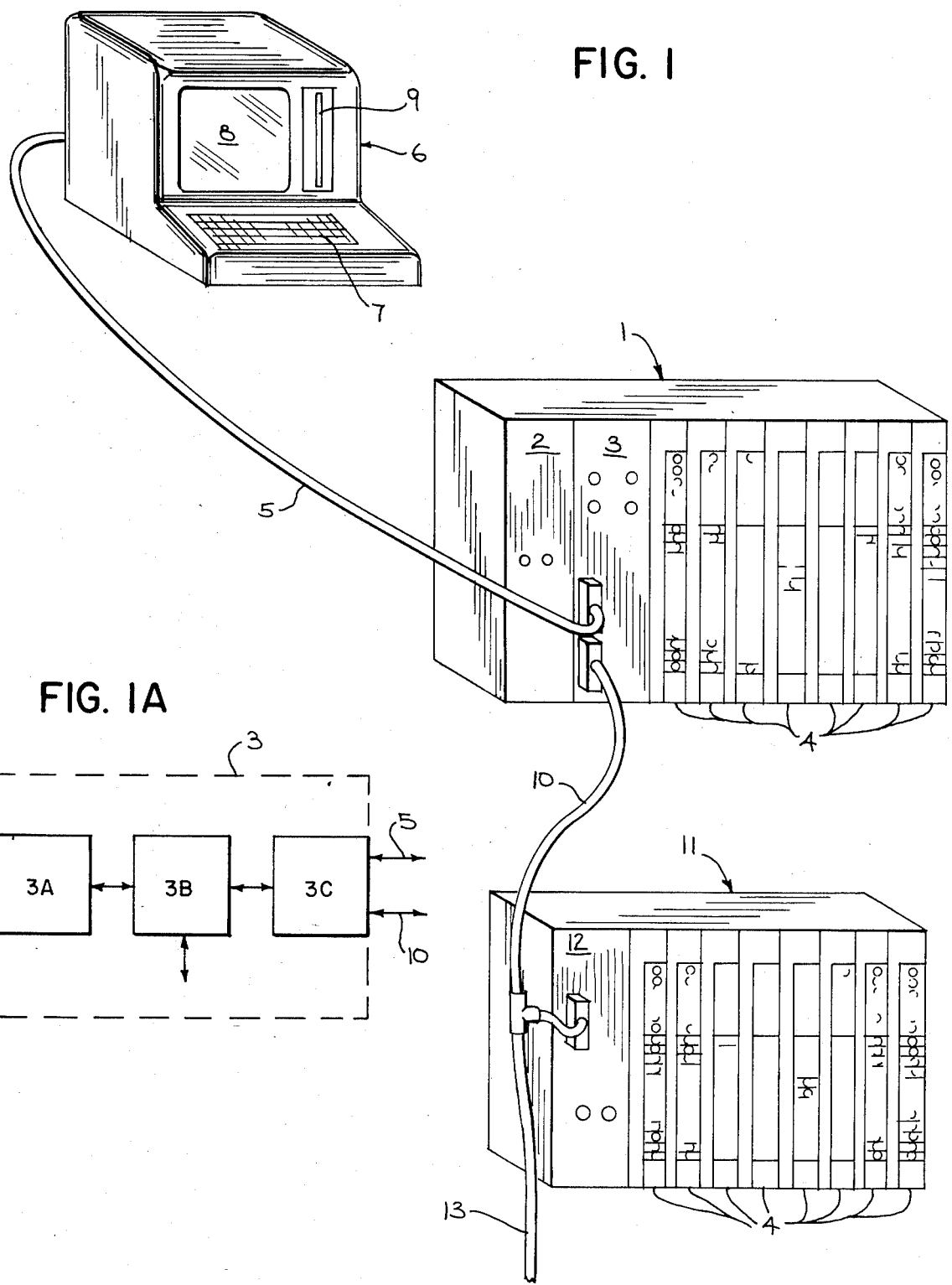
FIG. 1 is a perspective view of a programmable controller which employs the present invention.
FIG. 1A is a schematic block diagram of a processor module which forms part of the controller of FIG. 1.

Referring to FIG. 1, the programmable controller of the present invention is housed in a rack 1 which includes a series of slots that receive modules. These connect to a motherboard which extends along the back surface of the rack 1 to provide a backplane. The modules include a power supply module 2, a processor module 3 and a series of up to eight I/O modules 4. The I/O modules 4 take many forms and may include, for example, d.c. inputs or ouputs, a.c. inputs or outputs, analog inputs or outputs, and open or closed loop positioning modules. The physical construction of the rack 1 is disclosed in U.S. Pat. No. 4,151,580.

The processor module 3 is connected through a cable 5 to a programming terminal 6. The programming terminal 6 includes a keyboard 7 through which the user may enter data to program the processor module 3, operate the processor module 3, or monitor its operation. Alphanumeric data as well as ladder diagram representations of user control programs are produced on a CRT display 8, and programs and data may be stored on a floppy disk which is received in a disk drive unit 9. For a more detailed description of an industrial terminal suitable for this application, reference is made to U.S. Pat. No. 4,326,193 and co-pending U.S. patent application Ser. No. 490,740 filed on May 9, 1983 now U.S. Pat. No. 4,527,250.

The processor module 3 may also connect through a cable 10 to a remote I/O rack 11. The I/O rack 11 is similar in construction to the rack 1 and it contains a similar assortment of I/O modules 4 which connect through a backplane motherboard to an I/O adaptor module 12. The I/O adaptor module is described in U.S. Pat. No. 4,413,319 and its function is to couple data between the I/O modules 4 in the rack 11 and the processor module 3 in the rack 1. Similar remote I/O racks 11 may be connected to a cable 13 which connects to the I/O adaptor module 12.

As will be explained in more detail below, the user enters a control program into the memory of the processor module 3 through the programming terminal 6. The processor 3 is then placed in the "RUN" mode and it repeatedly executes the stored control program to operate output devices connected to output modules 4 in the racks 1 and 11 in response to the condition of input devices connected to input modules 4. Because the condition of certain input devices can change many times per second, it is imperative that the processor 3 have sufficient computing power to execute the stored control program rapidly. Also, because a large number and variety of input and output devices may be connected to the racks 1 and 11 to operate a complex machine or process, it is imperative that the control program be developed using a programming language which is easily understood by the user. Both of these design objectives are specifically addressed by the processor module 3 of the present invention.

HARDWARE

Figure 2:
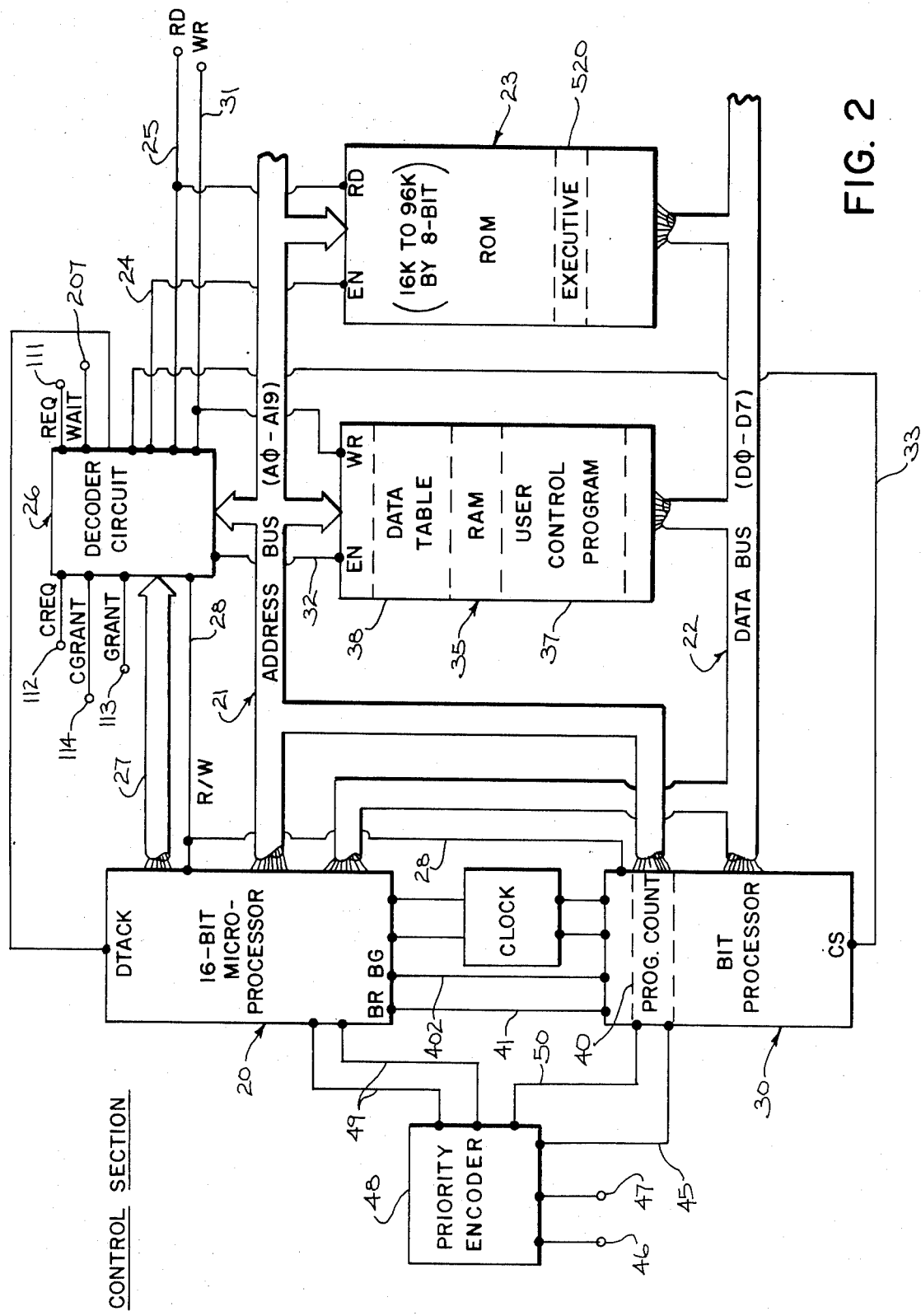
FIG. 2 is an electrical schematic diagram of a control section which forms part of the processor module of FIG. 1A.
Figure 3:
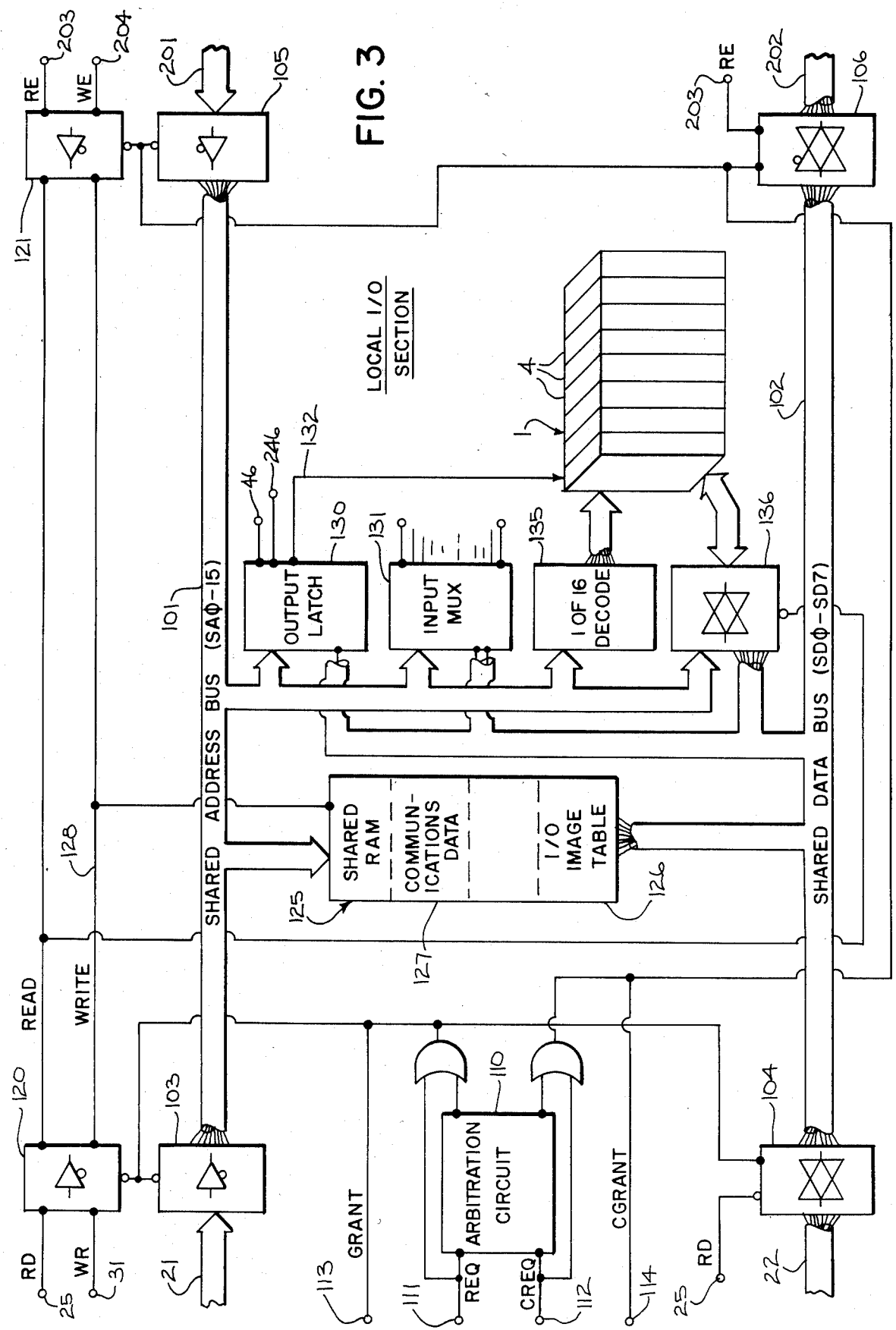
FIG. 3 is an electrical schematic diagram of a local I/O section of the processor module of FIG. 1A.

Referring to FIGS. 1A and 2–4, the processor module 3 is logically divided into three sections; a control section 3A shown in FIG. 2; a communications section 3C shown in FIG. 4; and a local I/O section 3B shown in FIG. 3. The control section 3A is primarily responsible for storing and executing the user's control program. The communications section 3C is primarily responsive for communicating with the programming terminal 6 and the remote I/O racks 11, and the primary functions of the local I/O section 3B are to communicate with the I/O modules 4 in the rack 1 and to couple the communications section 3C with the control section 3A. Each of these sections of the processor module 3 will now be described in more detail.

Referring particularly to FIG. 2, the control section 3A is structured about a 16-bit microprocessor 20 which drives a 20-lead address bus 21 and an 8-lead data bus 22. The microprocessor 20 executes machine language instructions which are stored in a read-only memory (ROM) 23 to carry out its functions. These mahcine language instructions are addressed by a program counter in the microprocessor 20 and they are read from the addressed line of the ROM 23 when an enable control line 24 and a read control line (RD) 25 are active. The fetched instruction is decoded and executed by the microprocessor 20 to carry out the indicated function. The functions performed in response to the execution of these machine language instructions, or "firmware", and the organization of the firmware, will be described in more detail below. For a detailed explanation of the machine language instruction set as well as the structure and operation of the microprocessor 20, reference is made to the booklet entitled "MC68008 16-Bit Microprocessor With 8-Bit Data Bus" published in 1982 by Motorola, Inc.

Data may be read from or written to other elements of the processor module 3 which are connected to the buses 21 and 22. The particular element is enabled by a decoder circuit 26 which receives address data from the address bus 21 and control signals from a control bus 27 that is driven by the microprocessor 20. The decoder circuit 26 also receives a signal from a R/W control line 28 which may be driven either by the microprocessor 20 or a separate bit processor 30, and it receives a number of other input signals which will be described in more detail below. In addition to the RD control line 25 and the ROM enable control line 24 described above, the decoder circuit 26 drives a write enable (WR) control line 31, a RAM enable control line 32, and a bit processor enable line 33. The other inputs to and outputs from the decoder circuit 26 will be discussed below in connection with the local I/O section 3B. Appendix A indicates the address space occupied by elements which are enabled by the decoder circuit 26.

A random access memory (RAM) 35 connects to the buses 21 and 22, and 8-bit bytes of data may be read from or written to an addressed line therein when the RAM enable control line 32 is active. The RAM 35 stores a variety of data structures which will be described in more detail below. However, most of these structures form part of a user control program indicated at 37 or a data table indicated at 38. The user control program includes one or more ladder programs that are comprised of instructions which are familiar to users of programmable controllers and which are loaded into the RAM 35 through the programming terminal 6. The user control program 37 also includes a structure chart program which is unique and which is described in more detail below. The microprocessor 20 executes the structure chart program, and depending on its type, a ladder program instruction may be executed either by the microprocessor 20 or the bit processor 30, as will be described in detail below.

When the microprocessor 20 executes a control program instruction, it employs an operation code in the instruction to locate a corresponding machine language interpreter routine which is stored in the ROM 23. The microprocessor 20 thus executes ladder program instructions by executing corresponding interpreter routines stored in the ROM 23. This interpretive technique for executing ladder programs is described in U.S. Pat. Nos. 4,165,534; 4,282,584 and 4,443,865.

The bit processor 30 is a custom integrated circuit which operates in tandem with the microprocessor 20 to execute directly selected ones of the ladder program instructions. The microprossor 20 begins the execution of the ladder program (i.e. the program scan), but it immediately relinquishes control to the bit processor 30. This transfer of control is accomplished by writing the address of the ladder program instruction to a ladder program counter register 40 in the bit processor 30. The bit processor 30 then removes the microprocessor 20 from the buses 21, 22 and 27 by enabling a bus request terminal through control line 41. The bit processor 30 fetches the ladder program instruction, executes it, and fetches subsequent ladder program instructions and executes them until one is encountered which it cannot execute. At that point, the bus request line 41 is released and the microprocessor 20 resumes control of program execution. The microprocessor 20 reads the contents of the ladder program counter register 40 into its own ladder program counter and proceeds to fetch and execute the indicated ladder program instruction. While the bit processor 30 is constructed to execute only a few "bit oriented" instructions, 75% to 95% of typical user ladder programs are comprised of these instructions. As a result, the total program scan time is significantly reduced by executing these few instruction types within the dedicated, high-speed bit processor 30.

The bit procesor 30 also includes a real time clock (not shown in FIG. 2) which produces an interrupt signal on control line 45 at regular intervals. This interrupt request, as well as two others on lines 46 and 47, are applied to the inputs of a priority encoder 48. The priority encoder 48 produces a 2-bit interrupt request to the microprocessor 20 on lines 49, and it indicates an interrupt request to the bit processor 30 through line 50. If the bit processor 30 has control at the moment of an interrupt request, it relinquishes control to the microprocessor 20 in the manner described above. The interrupt produced by the bit processor 30 is employed to implement a real time interrupt instruction as described in co-pending U.S. patent application Ser. No. 584,128 and entitled "Programmable Controller With Programmable Real Time Interrupt". The interrupt on line 46 emanates from the communications section 3C of the processor module 3 and it will be described in more detail below. The interrupt on line 47 is produced when a power loss is occurring, and in response, the microprocessor 20 takes certain emergency actions to insure that the system halts gracefully.

Referring particularly to FIG. 3, the local I/O section 3B of the processor module 3 connects to the address bus 21, data bus 22 and control lines 25 and 31 in the control section 3A described above. The local I/O section 3B is structured about a sixteen-lead shared address bus 101 and an eight-lead shared data bus 102. The shared address bus 101 may be driven by the address bus 21 when a set of tristate gates 103 are enabled, and data may be conveyed between the shared data bus 102 and the data bus 22 when bidirectional gates 104 are enabled. The direction of data transfer is determined by the state of the RD control line 25 which is driven by the decoder circuit 26 in the control section 3A.

Similarly, a set of tri-state gates 105 connect the shared address bus 101 to an address bus 201 in the communications section 3C, and a set of bi-directional gates 106 connect the shared data bus 102 to a data bus 202. The shared address bus 101 may, therefore, also be driven by the communications section 3C of the processor module 3 and data may thus be transferred between the data buses 102 and 202 in a direction indicated by an RE control line 203.

An arbitration circuit 110 determines which section of the processor module 3 may have access to the shared buses 101 and 102. The circuit 110 may receive a request signal from the control section 3A through REQ line 111 (decoder circuit 26 in FIG. 2) or it may receive a request from the communications section 3C through a CREQ control line 112. The arbitration circuit grants the request to one section at a time by producing a signal either on a GRANT line 113 or a CGRANT line 114. Both of these signals are conveyed to inputs on the decoder circuit 26 in the control section 3A (FIG. 2) and they are employed to enable the respective gates 103, 104 and 120 or gates 105, 106 and 121. In this manner either the control section 3A or the communciation section 3C of the processor module 3 may have access and control of the local I/O section 3B.

The local I/O section includes a random access memory (RAM) 125 which connects to the shared address bus 101 and shared data bus 102. The shared RAM 125 stores data which is passed back and forth between the two other sections of the processor module 3, and it includes a remote I/O image table 126 and communications data 127. Data may be written to or read from an addressed line of the shared RAM 125 when the RAM 125 is enabled by address bus lead SA11 and a WRITE control line 128 is active. The WRITE control line 128 is driven by the processor section 3A or 3C which has been granted control of the shared buses 101 and 102, and indeed, the shared RAM 125 occupies the same address space in each of these sections.

Referring still to FIG. 3, the local I/O section 3B also includes an 8-bit output latch 130 and a 16-bit input multiplexer 131. The output latch is enabled by address bus lead SA13 and the status of data bus lead SD0 may be written to one of the eight outputs as selected by the state of the three address bus leads SA0-SA2. One of these outputs drives the interrupt control line 46 connected to the priority encoder 48 (FIG. 2) and another output drives an interrupt control line 246 which produces a similar interrupt in the communications section 3C. Thus, by writing to the output latch 130 either section 3A or 3C of the processor module 3 may interrupt the other section, or even itself. A third output 132 on the latch 130 drives an I/O reset line which connect to each I/O module 4 in the local rack 1. This output may be operated to disable all operating devices controlled from the local rack 1.

The input multiplexer is enabled by address bus lead SA14 and the state of any two of the sixteen inputs are read onto data bus leads SD0-SD1 in response to the select code on address bus leads SA0-SA2. These inputs monitor the battery back-up and a variety of switches which indicate alternative functions that may be implemented.

Referring still to FIG. 3, the shared buses 101 and 102 are also coupled to the backplane of the rack 1 by a 1 of 16 decoder 135 and a set of bi-directional gates 136. An 8-bit byte of data may be written to or read from any one of sixteen I/O slots in the rack 1 when the address bus lead S12 is enabled. The addressed slot is identified by the select code on address bus leads SA1-S4. There are two I/O slots in each of the eight I/O modules 4 located in the rack 1 and either the control section 3A or the communications section 3C of the processor module 3 may thus read or write to any one of them.

The local I/O section 3B of the processor module 3 serves as a link between the other two sections. For example, the control section 3A periodically reads the state of the input devices connected to the local rack 1; updates its I/O image table 38 in the RAM 35 with this information; updates the output devices connected to the local rack 1; writes output data from its data table 38 to the I/O image table 126; and updates its data table 38 with the inputs from the I/O image table 126. The communications section 3C periodically updates the input section of the I/O image table 126 in the shared RAM 125 with the status of the input devices connected to the remote I/O racks 11; and reads the output portion of the I/O image table 126 for transmission to the output devices conencted to the remote I/O racks 11. Programming terminal messages which are received by the communications section 3C are stored in the communications portion 127 of the shared RAM 125 and any responsive messages from the control section 3A are read therefrom. As will be described in more detail below, every 10 milliseconds the communications section 3C also interrupts the operation of the control section 3A, and as part of its interrupt service routine, the control section 3A reads any messages which have been left for it in the shared RAM 125.

Referring particularly to FIG. 4, the communications section 3C of the processor module 3 is structured about an 8-bit microprocessor 205 which drives the 16-lead address bus 201 and the 8-lead data bus 202. The microprocessor 205 operates in response to machine language program instructions which are stored in a read-only memory (ROM) 206 to carry out most of the communication section functions. The microprocessor 205 is sold by Zilog, Inc. under the trademark "Z80", and for a description of its structure and instruction set, reference is made to the "Microcomputer Components Data Book" published in 1981 by Zilog, Inc.

When the microprocessor 205 generates an address code on the bus 201 in which lead AD15 is active, a request is made through control line CREQ 112 for access to the local I/O section 3B. As indicated above, this request is applied to the arbitration circuit 110 in the local I/O section 3B (FIG. 3) and to the decoder circuit 26 in the control section 3A (FIG. 2). The decoder circuit 26 responds by generating a signal on a WAIT control line 207 which places the microprocessor 205 in a wait state until access is granted by the arbitration circuit 110. When access is granted, the decoder circuit removes the signal from WAIT control line 207, and the microprocessor 205 may then perform memory read and write operations on data stored in the shared RAM 125. Only a momentary pause in its operation occurs when the shared RAM 125 is already being accessed by the control section 3A.

A major function of the communications section 3C is to link the two serial channels 5 and 10 with data structures in the shared RAM 125. These are high speed channels and to facilitate the handling of interrupts from them, an 8-bit microcomputer 210 is employed. The microcomputer 210 is also sold by Zilog, Inc. under the trademark "Z8" and it includes an internal masked ROM (not shown) which stores machine language instructions that direct its operation. The microcomputer 210 shares an 8K by 8-bit random access memory (RAM) 211 with the microprocessor 205 and its primary function is to handle all interrupts from the serial channels 5 and 10 and couple data between these channels 5 and 10 and the RAM 211. The microprocessor 205 then transfers this data between the RAM 211 and the shared RAM 125 in the local I/O section 3B.

Referring still to FIG. 4, a counter/timer circuit (CTC) 208 connects to the buses 201 and 202 and to an interrupt terminal 209 on the microprocessor 205. The CTC 208 receives interrupt requests from the local I/O section 3B via control line 246 and interrupt requests from the microcomputer 210 through control line 212. The CTC 208 may produce an interrupt request on control line 213, and it is also configured as a timer which produces an interrupt request on the lead 211 every ten milliseconds. In response to an interrupt request from the CTC 208, the microprocessor 205 reads a vector quantity from the CTC 208 which directs the microprocessor 205 to the appropriate interrupt service routine stored in the ROM 206.

The microprocessor 205 is coupled to the RAM 211 by a set of thirteen bus drivers 215 and a set of eight, bidirectional data gates 216. When the RAM 211 is addressed by the microprocessor 205, an arbitration circuit 217 is signaled by address bus lead AD15 and an MREQ control line 218. The arbitration circuit 217 places the microprocessor 205 in a wait state through control line 219 until access to the RAM 211 may be granted. At that point the gates 215 and 216 are enabled through control line 220 and the microprocessor 205 is released from the wait state to complete either a read or write cycle to the RAM 211. The microprocessor's write enable control line (WE) 204 is coupled to the RAM 211 by a tri-state gate 211 to select either a read or write operation, and this same control line controls the direction of data flow through the gates 216.

The microcomputer 210 drives an 8-bit data bus 225 which connects to an address latch 226, a serial communications controller (SCC) circuit 227 and a set of eight, bidirectional data gates 228. It also drives eight higher order address lines which are combined with the lower order lines driven by the address latch 226 to produce an address bus 230. In a typical read or write cycle, the lower order address bits are stored in the address latch 226 when an address strobe line 231 is active and then the higher order bits are produced on the address bus 230 and data is conveyed through the data bus 225.

The microcomputer 210 may gain access to the RAM 211 in a manner similar to that employed by the microprocessor 205. When address bus lead MA14 is active, a request for access to the RAM 211 is made to the arbitration circuit 217. When access is granted, control line 235 is active and a set of bus drivers 236 and the bidirectional data gates 228 are enabled to couple the buses 230 and 225 to the RAM 211. A read or write cycle is executed, as determined by the state of WT control line 237, which is coupled to the RAM 211 by tri-state gate 238.

The SCC 227 is commercially available in integrated circuit form from Zilog, Inc. and it operates to service the two serial channels 5 and 10. When a byte of data is received at either channel 5 or 10, the SCC 227 interrupts the microcomputer 210 through a line 240 and the microcomputer 210 responds by reading a vector from the SCC 227 which points to the appropriate interrupt service routine stored in the microcomputer's internal ROM. The received byte of data may be combined with other received data to form a message from the programming terminal 6 or it may form a block of status information from an I/O rack 11. In either case, the information is placed in the proper form by the microcomputer 210 and written to an I/O image table 241 or a message data section 242 of the RAM 211. Similarly, the microcomputer 210 may read data from the RAM 211 and place it in a form for transmission on either of the serial channels 5 or 10. A more detailed description of the manner in which information is conveyed between the serial channels 5 and 10 and the microprocessor 205 will be made hereinafter.

Most of the components employed in the three sections of the processor module 3, which are described above, are commercially available from a number of sources. Reference is made to Appendix B for a detailed list of these components and their sources. One exception is the bit processor 30 in the control section 3A. This component is a custom designed integrated circuit which is not commercially available in this form. However, as will now be described, the bit processor 30 is comprised of elements which are functionally equivalent to components that are commercially available.

Figure 5A:
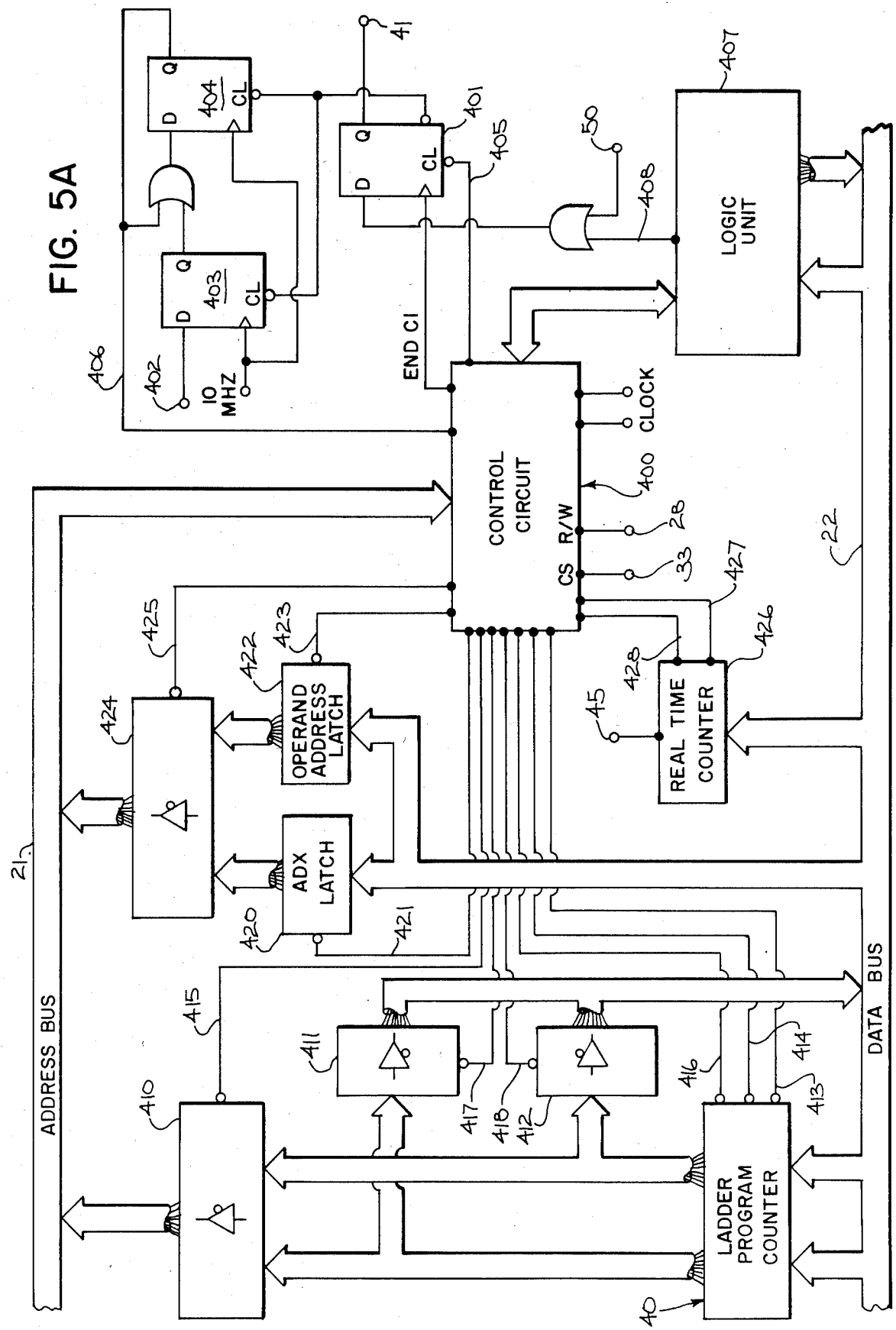
FIG. 5A is an electrical schematic diagram of a bit processor which forms part of the control section of FIG. 2.

Referring to FIGS. 2 and 5A, the bit processor 30 is structured about a control circuit 400 which may be addressed through the address bus 21 when the enable line 33 is active. The 16-bit microprocessor 20 may transfer control to the bit processor 30 by generating a "transfer" address which is decoded by the control circuit 400 to reset a D-type flip-flop 401 through its clear line 405. A bus request is then produced on the control line 41 by the flip-flop 401, and the 16-bit microprocessor 20 responds by disconnecting itself from the buses 21 and 22 and generating a signal on a bus grant control line 402. A pair of cascade connected flip-flops 403 and 404 latch this signal and produce an enable signal on a control line 406 to the control circuit 400. The microprocessor 20 is thus inhibited from further operation and the bit processor 30 begins active operation.

Once enabled, the control circuit 400 produces timing signals to the various bit processor elements now to be described. These timing signals produce three distinct cycles (C1, C2 and C3) which are required to carry out the bit processor's functions. The C1 cycle is a "read word" cycle in which the ladder program instruction indicated by the ladder control program counter 40 is fetched from the RAM 35. Depending on the operation code in the fetched instruction, either a C2 cycle or a C3 cycle may then be performed. The C2 cycle is a "read modify write" cycle in which an operand is read from the data table 38 in the RAM 35, a bit therein is altered, and then the altered data is written back to the data table 38. The C3 cycle is a "read test" cycle in which an operand is read from the data table 38 and a bit therein is tested by a logic unit 407. Timing charts for each of these cycles are shown in FIG. 5C.

The bit processor 30 retains control of the control section 3A and continues to execute the ladder program as long as any of the following ladder instructions are fetched from the user control program 37.

XIC—"Examine for Closed" instruction tests a bit in the data table 38 for a logic one, representing a closed contact at the corresponding live input. The rung status is set false if the bit is not one, otherwise it is not changed.

XIO—"Examine for Open" instruction tests a bit in the data table 38 for a logic zero, representing an open contact at the corresponding live input. The rung status is set false if the bit is not off, otherwise it is not changed.

OTE—"Output Energize" instruction sets a bit in the data table 38 if the rung status is true. Otherwise the bit is reset. The rung status is initialized to a true state again.

OTL—"Output Latch" instruction sets a bit in the data table 38 if the rung status is true. Otherwise the bit is unchanged. The rung status is initialized to a true state again.

OTU—"Output Unlatch" instruction resets a bit in the data table 38 if the rung status is true. Otherwise the bit is unchanged. The rung status is initialized to a true state again.

BST—"Branch Start" instruction performs the necessary stacking of current status in an internal "stack" register, in order to enable the processing of parallel logic paths.

NXB—"Next Branch" instruction identifies the beginning of another parallel logic path and reinitializes the current rung status.

BND—"Branch End" instruction performs the necessary unstacking of status and updating of the master rung status at the conclusion of parallel logic paths.

ADX—"Address Extension" instruction provides addition addressing space beyond the normal 256 words available through the standard 8 bits of operand address which follow the above opcodes. This is accomplished by using the second byte of this opcode as the data for the high byte of the operand address for the succeeding instruction.

Referring particularly to FIG. 5A, if a control program instruction other than one of the above is fetched, a control line 408 at the output of the logic unit 407 is enabled. As a result, at the end of the current C1 cycle the D-type flip-flop 401 is reset and the bus request signal is removed from control line 41. The flip-flops 403 and 404 are also cleared and the control circuit 400 is placed in a passive mode through the control line 406. Control is thus passsed back to the 16-bit microprocessor 20 which can then read from or write to elements of the bit processor 30 by enabling the control line 33.

Referring still to FIG. 5A, in addition to the ladder program counter 40 and logic unit 407, elements of the bit processor 30 include a set of sixteen address bus gates 410 and two sets of eight data bus gates 411 and 412 which couple to the ladder program counter 40. The 16-bit microprocessor 20 may write two successive bytes of data to the ladder program counter 40 and these preset the counter 40 such that it addresses the proper point in the ladder program. The counter 40 is preset in this manner when respective control lines 413 and 414 are active during microprocessor write cycles. The output of the ladder program counter 40 is applied to the address bus 21 during each C1 cycle of the ladder circuit 400 by enabling the address bus gates 410 through control line 415. The control program counter 40 is incremented by the control circuit 400 through control line 416 in the middle and the end of the C1 cycle. When control is passed back to the 16-bit microprocessor 20, it may read the contents of the ladder program counter 40 by successively enabling the data bus gates 411 and 412 through respective control lines 417 and 418. As indicated above, the two 8-bit bytes of data read from the counter 40 are employed by the microprocessor 20 to fetch the next ladder program instruction when the microprocessor 20 resumes control.

During the C1 cycle the ladder program instruction indicated by the counter 40 is fetched from the RAM 35. Each such instruction includes an operation code which is applied to the logic unit 407 and all but the BST, NXB and BND instructions include an accompanying operand or operand address. If the operation code is "ADX", it is accompanied by an operand which is read from the RAM 35 and stored in an ADX latch 420 when a control line 421 is operated by the control circuit 400. Otherwise, an accompanying operand address is read from the RAM 35 and stored in an operand address latch 422 when a control line 423 is operated by the control circuit 400. During the subsequent C2 or C3 cycle, the 16-bit address produced by the ADX latch 420 and the operand address latch 422 are applied to the address bus 21 by a set of gates 424 which are enabled by a control line 425. The desired operand stored in the data table 38 of the RAM 35 may thus be addressed and operated upon by the bit processor 30.

Referring still to FIG. 5A, the bit processor 30 also includes a real time counter 426 which connects to the data bus 22. The real time counter is preset by the 16-bit microprocessor 20 which writes a number thereto by enabling control line 427 through control circuit 400. The real time counter 426 is then decremented by a clock signal on line 428 until it reaches zero. An interrupt request signal is then produced on the line 45 which is applied to the priority encoder 48 (FIG. 2) as described above. The real time counter 426 is preset with a value which produces such an interrupt at regular intervals.

Figure 5B:
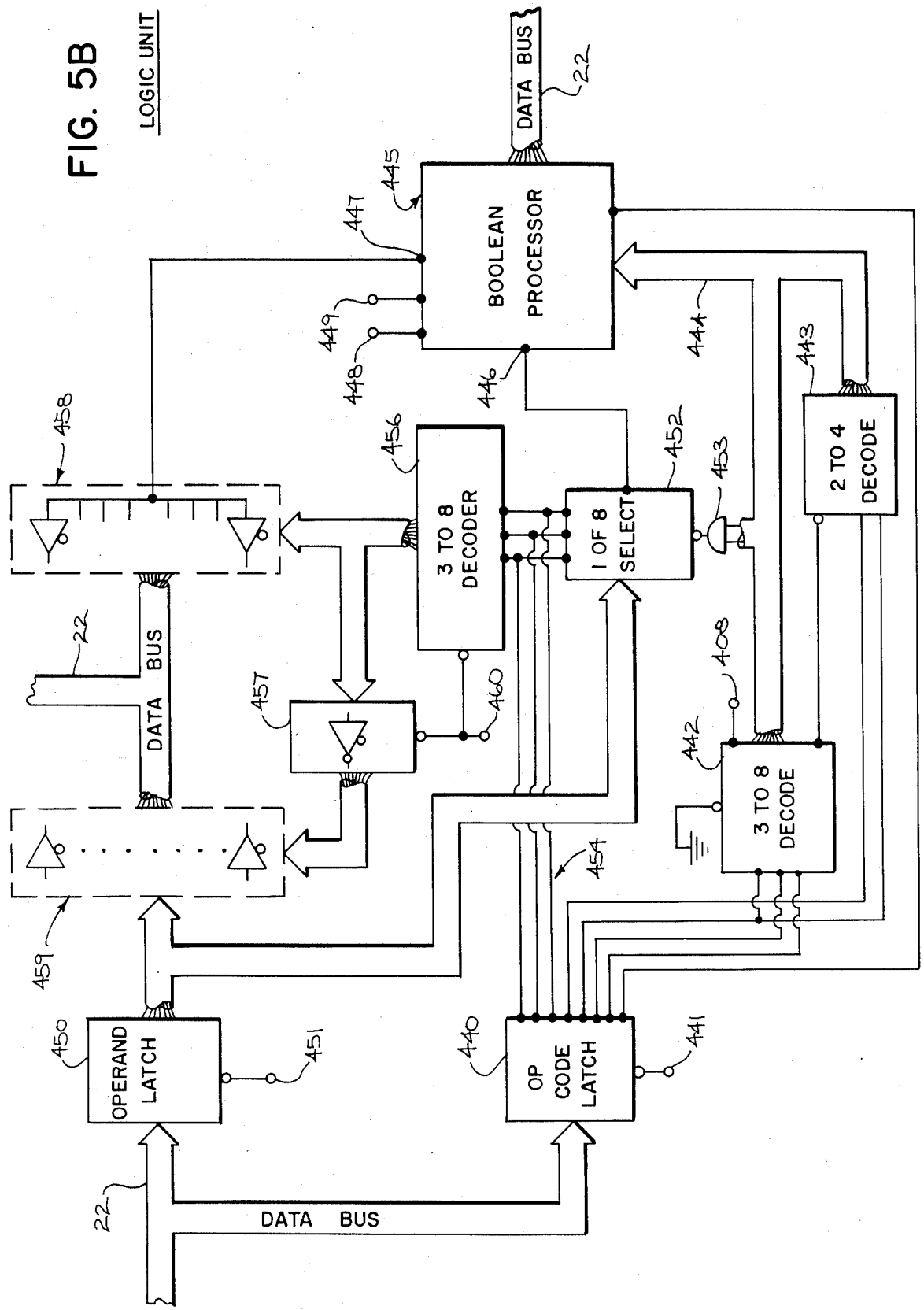
FIG. 5B is an electrical schematic diagram of a logic unit which forms part of the bit processor of FIG. 5A.
Figure 5C:
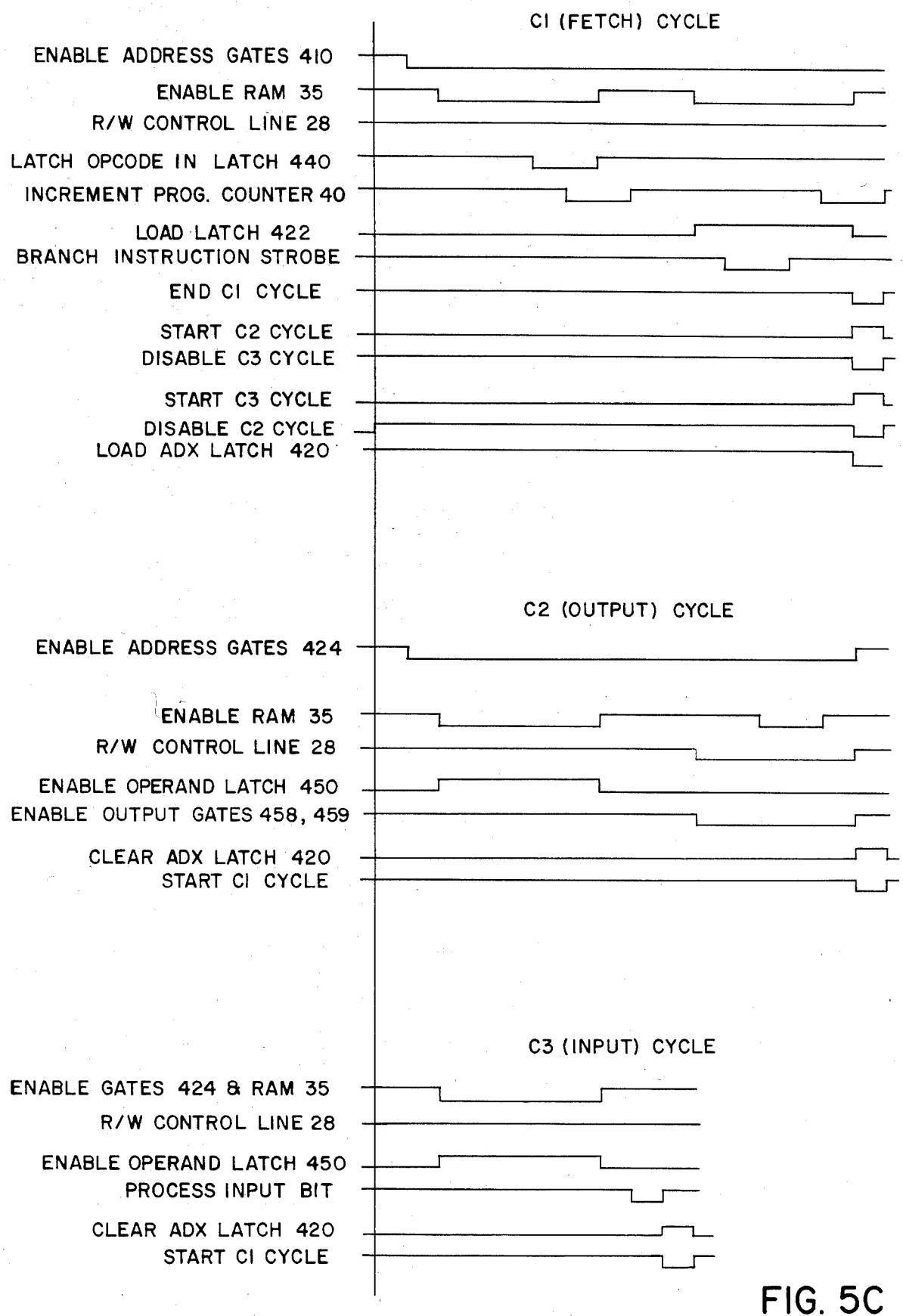
FIG. 5C is a timing chart which illustrates the operation of the control circuit in FIG. 5A.

Referring particularly to FIGS. 5A and 5B, the logic unit 407, which forms part of the bit processor 30 receives the operation code portion of each control program instruction at a latch 440. The latch 440 is enabled by the control circuit 400 through a line 441 during the C1 cycle. Five bits of the operation code are decoded to indicate the operation to be performed by the logic unit 407 and three bits are employed as a bit-pointer code to select one of eight bits in the operand which is to be operated upon. A 3-to-8 decoder 442 and a 2-to-4 decoder 443 are employed to decode the operation code, and the resulting outputs are applied through a control bus 444 to a Boolean processor 445. The Boolean processor is similar to that disclosed in U.S. Pat. No. 4,165,534 which issued on Aug. 21, 1979, and is entitled "Digital Control System with Boolean Processor". It receives single-bit input data at a terminal 446 during the execution of XIC or XIO instructions, and it produces a single-bit output at a terminal 447 when an OTE, OTL or OTU instruction is executed. The state of the Boolean processor 445 may be read onto the data bus 22 by the 16-bit microcomprocessor 20 when an enable line 448 is activated by the control circuit 400, and the state may be restored to the Boolean processor 445 when a control line 449 is activated.

When an operation code other than one of those which are executable by the bit processor 30 is received at the op code latch 440, a signal is produced on the control line 408 by the 3-to-8 decoder 442. As described above, when this occurs the 16-bit microprocessor 20 is awakened and the bit-processor 30 is placed in its passive mode. Typically then, the 16-bit microprocessor 20 will fetch the same instruction from the ladder program, will read the state of the Boolean processor 445 into one of its internal registers, and will execute the ladder program instruction by mapping to the appropriate interpreter routine stored in the ROM 23. When finished, the 16-bit microprocessor 20 writes the state of its internal register back to the Boolean processor 445 and hadns control back to the bit processor 30.

Referring particularly to FIG. 5B, when either an XIC or an XIO instruction is executed by the bit processor 30, a C3 cycle is performed after the ladder program instruction is fetched during the C1 cycle. The operand indicated by the operand address in the ladder program instruction is read from the data table 38 during the C3 cycle, and it is stored in an operand latch 450 in response to a signal from the control circuit 400 (FIG. 5A) on line 451. A 1 of 8 selector circuit 452 connects to the output of the operand latch 450 and it is enabled by an AND gate 453 when either the XIC or XIO operation code is present in the latch 440. The bit pointer code produced at the outputs 454 of the OP code latch 440 drive the select terminals of the 1 of 8 selector 452, and as a result, the state of one of the eight bits in the operand is applied to the input 446 on the Boolean processor 445.

When one of the output instructions (OTE, OTL or OTU) is executed, the control circuit 400 peforms a C2 cycle after the ladder program instruction is fetched during the C1 cycle. The output bit to be operated upon is read from the data table 38 during the C2 cycle and stored in the operand latch 450. The bit point code produced at the outputs 454 is applied to the inputs of a 3-line-to-8-line decoder 456, and its eight outputs are connected to the inputs of eight tri-state inverter gates 457. These same outputs are connected to the respective enable terminals on eight bus driver gates 458, and the input on each of these gates 458 is connected to the output 447 of the Boolean processor 445. The inverter gates 457 drive the respective enable terminals on eight additional bus driver gates 459, and when the inverter gates 457 are enabled through control line 460 by the control circuit 400, seven of the eight bits in the operand latch 450 are coupled to the data bus 22. The eight bit, as selected by the bit pointer code, is not passed through to the bus 22, but instead, the lead in the data bus 22 which corresponds to this bit is driven by the Boolean processor output 447 through one of the bus driver gates 458. The operand indicated in an output program instruction is thus read from the data table 38 and written back to the data table 38 with the selected bit therein modified by the output of the Boolean processor 445.

DATA STRUCTURES

Figure 6:
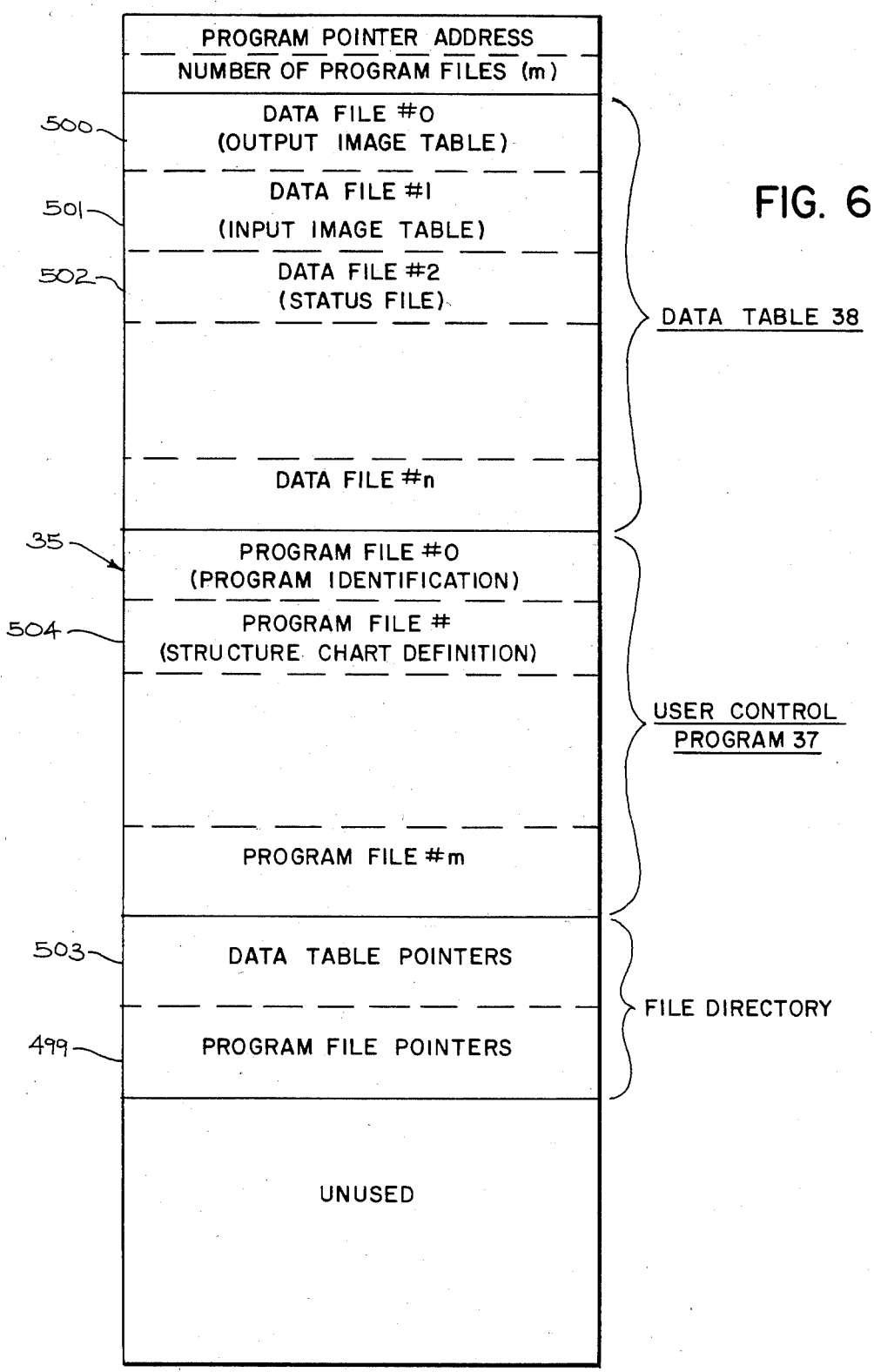
FIG. 6 is a memory map of a random access memory which forms part of the control section of FIG. 2.

Referring particularly to FIGS. 2 and 6, the RAM 35 stores a number of data structures which are employed by the 16-bit microprocessor 20 and the bit processor 30 to carry out their functions. As indicated above, these include the data table 38 and the user control program 37 which are shown in more detail in FIG. 6.

The data table 38 is comprised of separate data files, each of which may contain a specific data type, and each of which may perform a specific function in the operation of the programmable controller. Data file #0, for example, is an integer type file which functions as an output image table 500, and data file #1 is an integer type file which functions as an input image table 501. Data file #3 is also an integer type file which is dedicated to function as a status file 502. The contents of the status file 502 will be described in detail below, and as in prior programmable controllers, the input image table 500 and the output image table 501 are images of the state of the I/O devices connected to the I/O modules 4 in the controllers I/O racks 1 and 11.

Figure 8:
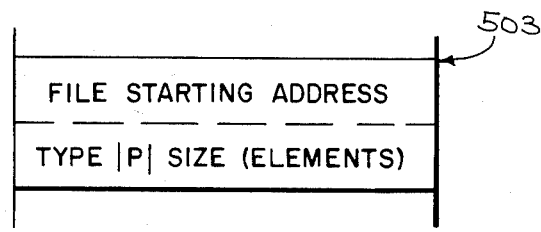

Referring particularly to FIGS. 6 and 8, the data table 38 may contain many other data files, any one of which may be located using data table pointers 503 stored in a file directory section of the RAM 35. Each data table pointer 503 includes a one word "file starting address" which indicates the absolute address in the RAM 35 of its associated data file. A second word in each data table pointer 503 indicates the type of data in the file, the number of elements in the file, and whether or not the file is write protected (P). The data types are indicated by the following codes:

0000=integers;
0001=timer structures for ladder program timer instructions;
0010=counter structures for ladder program counter instructions;
0011=control structures;
0100=floating point numbers;
0111=ASCII characters;
1111=BCD data for display purposes.

Figure 9:
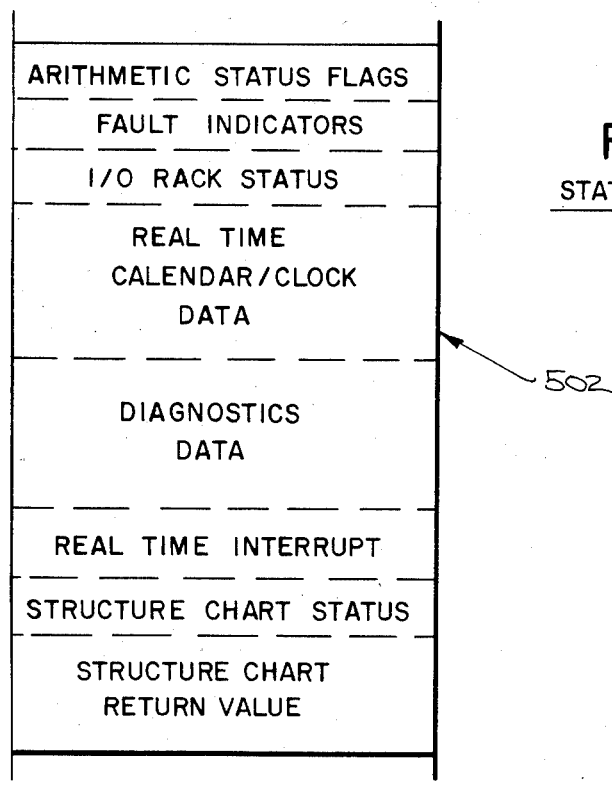

As indicated above, data file #2 is dedicated to function as the status file 502. Referring particularly to FIG. 9, the status file 502 is thirty-two words in length and it includes a number of dedicated structures:

| word | Description |
|---|---|
| 0 | arithmetic status flags. |
|  | bit 0 = C - carry |
|  | bit 1 = V - overflow |
|  | bit 2 = Z - zero |
|  | bit 3 = N - sign |
| 1 | fault routine program file number. |
|  | (0=no fault routine) |
| 2 | faults |
|  | bit 0 = software watchdog |
|  | bit 1 = illegal op-code |
|  | bit 2 = illegal address |
|  | bit 3 = no label |
|  | bit 4 = stack error |
| 3 | file number of program being run when fault occurred. |
| 4 | rung number being executed when fault occurred. |
| 5 | I/O faults, status and scan inhibit |
|  | bit 0 = rack 0 faulted |
|  | bit 1 = rack 1 faulted |
|  | bit 2 = rack 2 faulted |
|  | bit 3 = rack 3 faulted |
|  | bit 4 = rack 0 status |
|  | bit 5 = rack 1 status |
|  | bit 6 = rack 2 status |
|  | bit 7 = rack 3 status |
|  | bit 8 = rack 0 scan inhibit |
|  | bit 9 = rack 1 scan inhibit |
|  | bit 10 = rack 2 scan inhibit |
|  | bit 11 = rack 3 scan inhibit |
| 6 | real time clock year (0-32,767) |
| 7 | real time clock month (1-12) |
| 8 | real time clock day (1-31,30,29,or28) |
| 9 | real time clock hours (0-23) |
| 10 | real time clock minutes (0-59) |
| 11 | real time clock seconds (0-59) |
| 12 | program area checksum |
| 13 | previous scan time |
| 14 | largest previous scan time |
| 15 | program watchdog set point |
|  | (0=disabled) |
| 16 | real time interrupt set point in milliseconds |
|  | (0=disabled) |
| 17 | real time interrupt file number |
|  | (0=disabled) |
| 18 | structure chart status |
|  | bit 0 = first scan flag |
|  | bit 8 = restart at beginning when powerup |
| 19 | structure chart return value |

Figure 7:
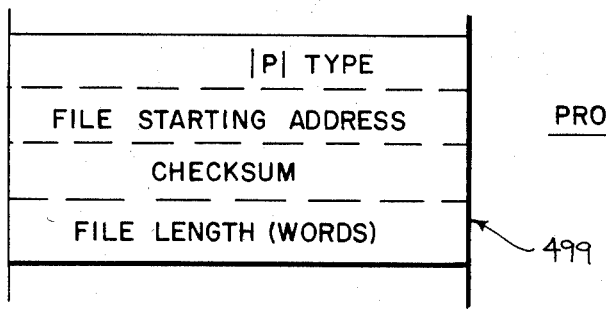
FIGS. 7–9 are schematic representations of data structures stored in the random access memory of the control section of FIG. 2.

Referring particulary to FIGS. 6 and 7, the user control program 37 is comprised of separate program files. Program files #0 and #1 are dedicated to specific functions, but the rest are variable in both type and size. Program file #0 is for program identification, and as will be described in more detail below, program file #1 is the active structure chart definition 504, or structure chart program. Each program file in the user control program 37 is identified by a program file pointer 499 which is stored in the file directory section of the RAM 35. Each pointer 505 indicates the program file type, absolute memory starting address and length of the program. Each pointer 499 also indicates if the file is write protected (P), and it provides a checksum of the program file which is employed as a diagnostic tool.

There are three types of program files: ladder; structure chart; and machine language. Ladder program files may be executed by the processor module 3 and they are comprised of instructions of the type which are conventionally found in programmable controllers. The term "ladder" is derived from the ladder diagram format which is used to display the program on the programming terminal 6. Machine language program files contain instructions which are executable directly by the 16-bit microprocessor 20. These programs are employed to implement the dual language feature as described in U.S. Pat. No. 4,302,820.

Figure 12A:
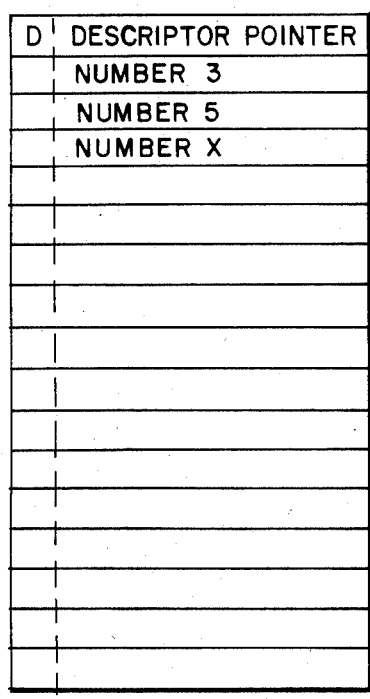
FIGS. 12A–12C are schematic representations of data structures which are employed by the program of FIG. 11 and which are stored in the random access memory of the control section of FIG. 2.
Figure 12B:
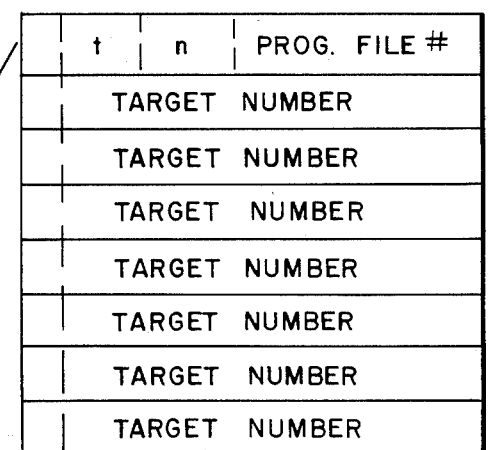
Figure 12C:
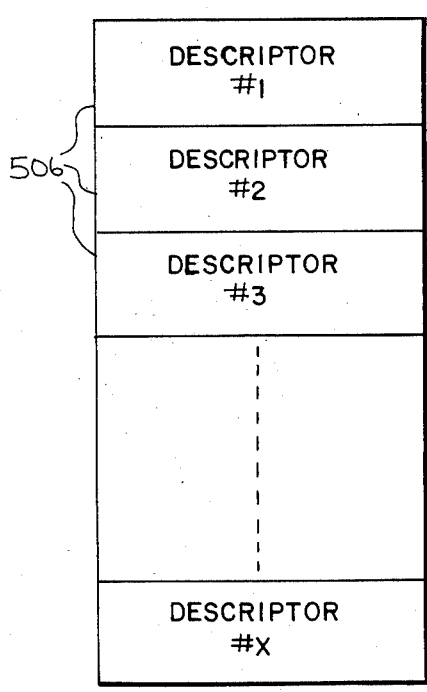

The structure chart programs are a new concept in programmable controllers and they are executed by a structure chart interpreter routine which will be discussed in more detail below. As shown in FIGS. 12A-12C, in addition to using the structure chart definition program file 504, the structure chart interpreter routine employs an active state list 505 which is stored in the RAM 35 and which is composed of up to sixteen descriptor pointers. These descriptor pointers are addresses of descriptors 506 that are stored in the structure chart definition 504. The structure chart definition program file 504 is nothing more than a set of such descriptors 506 which have been created using the programming terminal 6. The descriptors 506 include the number of a ladder program file which is to be run when the descriptor 506 is active. As will be described in more detail below, the active state list 505 points to specific ones of the descriptors 506 and thereby indicates those ladder programs which are to be run by the processor module 3 at any point in time.

Figure 14:
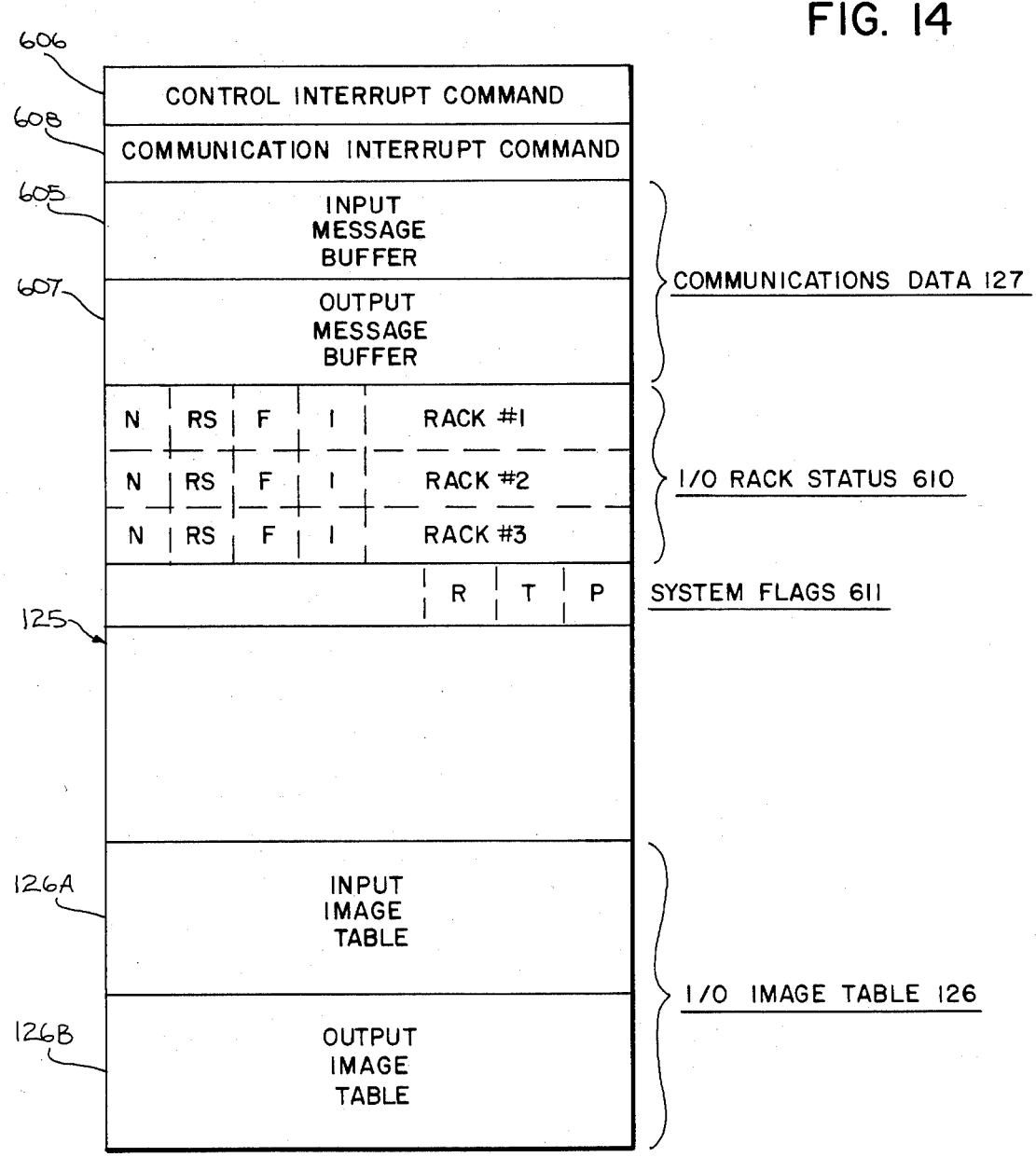
FIG. 14 is a memory map of the random access memory which forms part of the local I/O section of FIG. 3.

As indicated above, the shared RAM 125 in the local I/O section 3B is employed to pass information between the control section 3A and the communications section 3C. Referring particularly to FIGS. 3 and 14, when the communications section 3C receives a message from the programming terminal 6 which requires a response from the control section 3A, a suitable command is written to an input message buffer 605 in the shared RAM 125. A suitable command is then written to a control interrupt command location 606 in the shared RAM 125 and the 16-bit microprocessor 20 is interrupted by writing to the output latch 130 as described above. As part of its interrupt service routine the microprocessor reads the control interrupt command 606 and determines that a programming terminal command awaits execution in the input message buffer 605.

After executing the programming terminal command, the control section 3A writes a response to an output message buffer 607 and a command code to a communication interrupt command location 608. The communications microprocessor 205 is then interrupted by writing to the output latch 130. As part of its interrupt service routine, the communications microprocessor 205 reads the communication interrupt command 608, determines that a response awaits it in the output message buffer 607, and reads that responsive message from the shared RAM 125. The interrupt command locations 606 and 608 thus operate in combination with the message buffers 605 and 607 to provide an orderly flow of information between the programming terminal 6 and the control section 3A of the processor module 3.

A somewhat similar exchange of data occurs with respect to the remote I/O rack data. Referring still to FIGS. 3 and 14, input data from the three remote I/O racks 11 is received by the communication section 3C and written to the input portion 126A of the I/O image table 126. As part of its regular I/O scan routine which will be described in more detail below, the 16-bit microprocessor 20 reads this input image data from the shared RAM 126 and writes it to its own data table 38. As part of that same I/O scan routine, the 16-bit microprocessor 20 updates an output portion 126B of the I/O image table 126 by transferring data from its own data table 38. The communications section 3C couples this output data to the appropriate I/O rack 11.

Each remote I/O rack 11 has an I/O rack status word 610 stored in the shared RAM 125. These status words provide the following information regarding the state of their respective remote I/O racks.

N=new outputs bit is set by 16-bit microprocessor 20 when it updates output image table 126B and is reset by communications microprocessor 205 when the outputs are sent to the remote I/O rack 11.

RS=outputs are to be reset when this bit is set by either microprocessor 20 or 205.

F=an I/O fault is indicated when this bit is set.

I=The output scan to this I/O rack 11 is inhibited.

The I/O rack status words 610 are thus employed to coordinate the coupling of I/O data between the remote I/O racks 11 and the control section 3A of the processor module 3.

One other data structure stored in the shared RAM 125 is a system flags word 611. This flag word 611 stores a set of three bits which indicate the mode in which the programmable controller is to operate.

R=RUN mode when set.

T=Test mode when set.

P=Program mode when set.

These bits can, of course, be changed or tested by either the control section 3A or the communication section 3C of the processor module 3.

Figure 15:
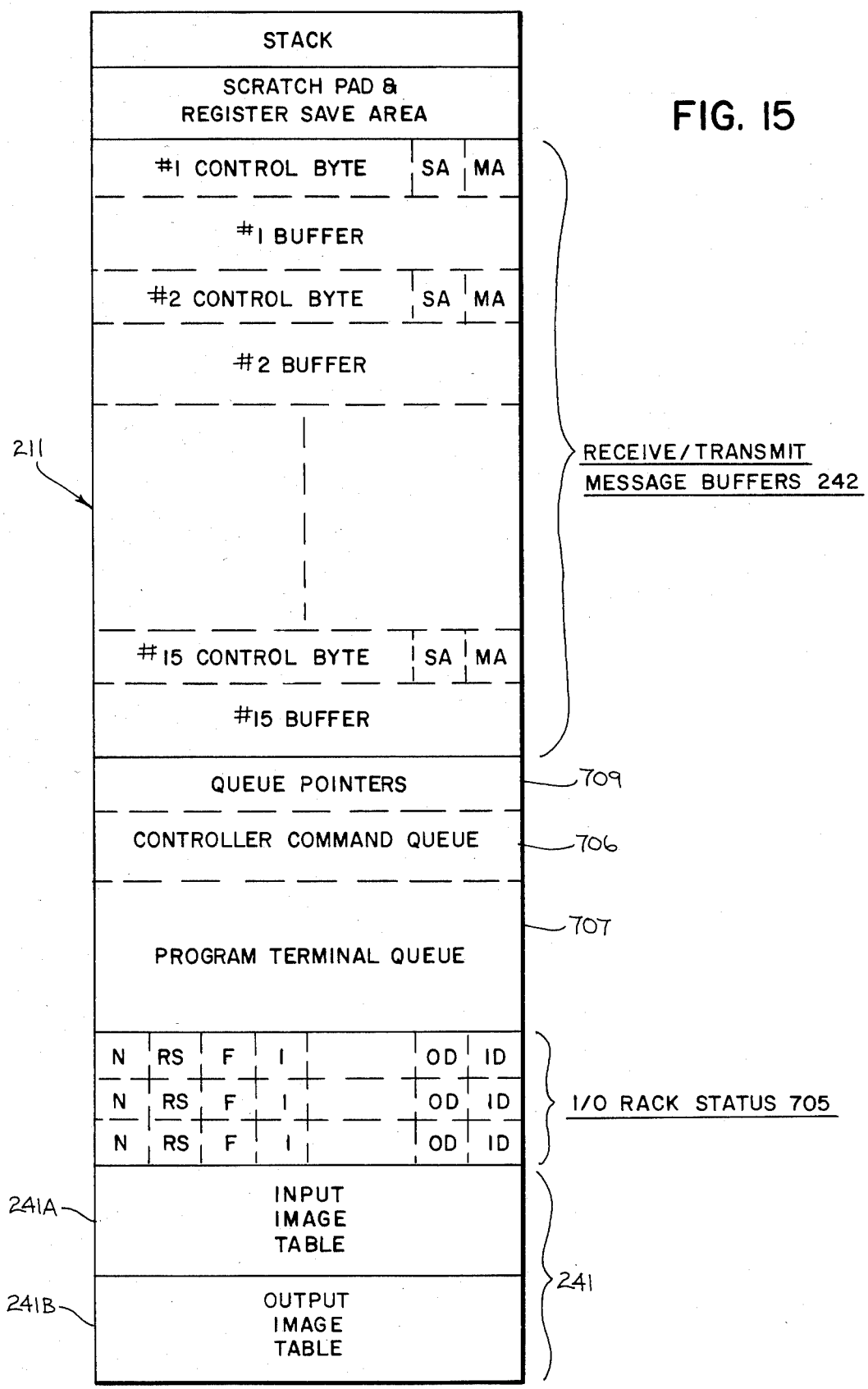
FIG. 15 is a memory map of the random access memory which forms part of the communications section of FIG. 4.

Referring particularly to FIGS. 4 and 15, the RAM 211 in the communications section 3C stores data which is shared by the microprocessor 205 and the microcomputer 210. It includes the input and output portions of the remote I/O image table 241 and a set of three I/O rack status words 705. The status words 705 provide the following information with respect to each of the three remote I/O racks 11.

N=new outputs bit is set by microprocessor 205 when it updates the output image table 241 and is reset by microcomputer 210 when it updates the I/O racks 11.

RS=outputs are to be reset when bit is set.

F=an I/O fault has occurred in this rack.

I=inhibit output scan when bit is set.

OD=outputs have been sent to I/O rack.

ID=inputs have been scanned.

Input messages from the programming terminal 6 or other "stations" connected to the serial channel 5 are stored in message buffers 242. The message buffers 242 also store the responsive messages from the processor module 3. As indicated above, some of these responsive message may originate in the control section 3A, or they may originate in the communications section 3C itself. There are a total of fifteen message buffers, each storing up to 71 bytes of data and a single control byte. The control byte is employed to coordinate the processing of its associated message and includes a station active flag (SA) and a message active flag (MA). The station active flag (SA) is set when a message has been received in its buffer from the programming terminal 6 or other station on the serial channel 5. This bit is reset after a response is sent back to the originating device through the same buffer. The message active flag (MA) is set when message data is placed in the buffer 242 by the microprocessor 205 and it is reset when the entire message has been transmitted by the microcomputer 210 through in serial port 5.

Because the microprocessor 205 may be called upon to perform a number of tasks at the same time, it operates in response to a scheduler program which is stored in the ROM 206. This scheduler employs a set of three data structures; a controller command queue 706; a program terminal queue 707; and a remote I/O queue 708. These queues 706–708 are a list of tasks to be performed by the microprocessor 205, and a queue pointer 709 indicates which of the tasks is currently being executed.

OPERATION

Figure 10:
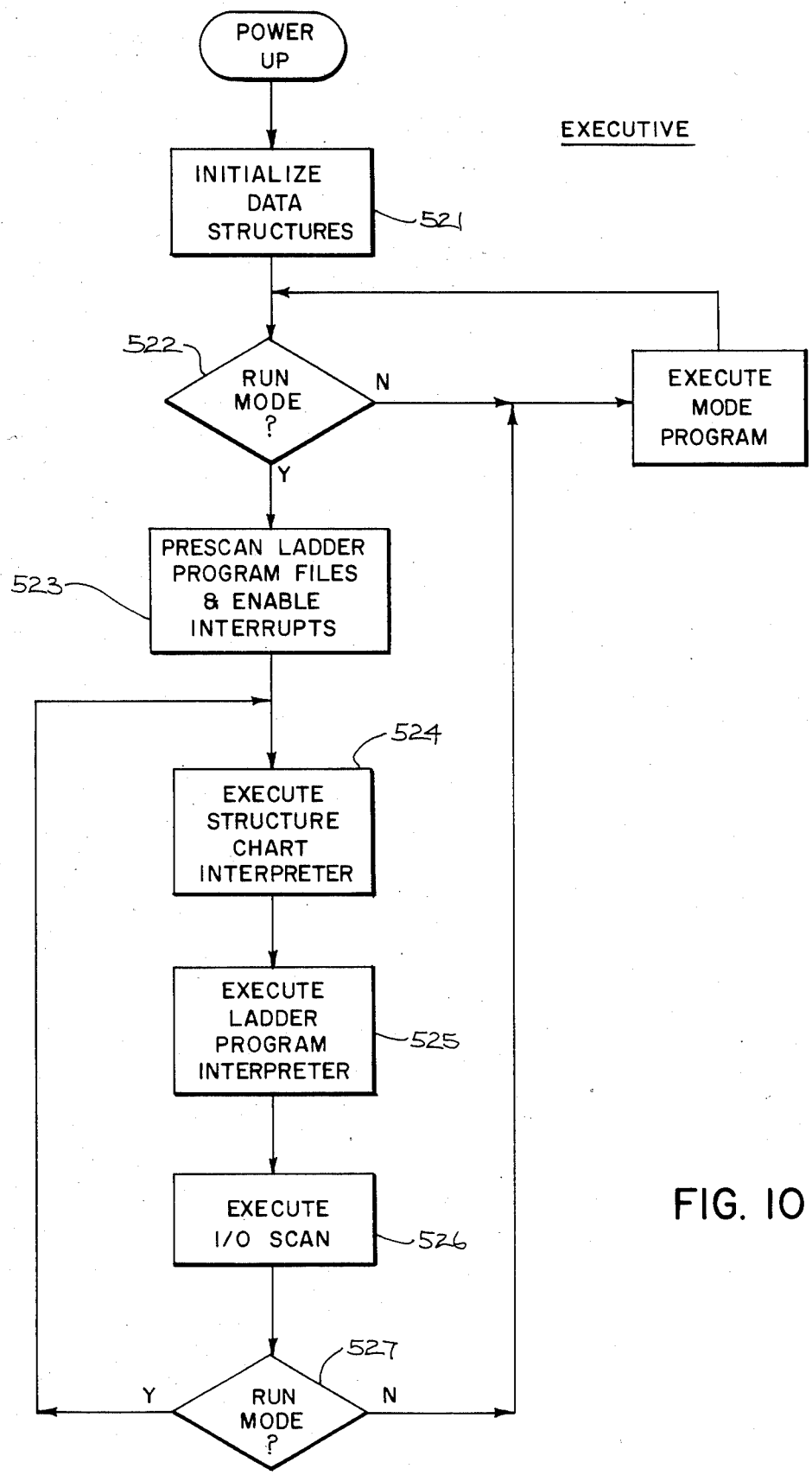
FIG. 10 is a flowchart of an executive program which is executed by the control section of FIG. 2.

The operation of the control section 3A of the processor module 3 is controlled by an executive routine 520 which is stored in the ROM 23. Referring particularly to FIGS. 2 and 10, when the programmable controller is powered up a set of instructions indicated by process block 521 are executed to create and initialize the data structures stored in the RAM 35. If the system is in the "RUN" mode as determined at decision block 522 a prescan process is begun, as indicated at process block 523. All programs of the ladder type are scanned to set all their rungs false, the output image table 500 is written to both the local rack 1 and the shared RAM 125 in the local I/O section 3B, and the input image table 501 is updated by reading input status from both the local rack 1 and the shared RAM 125. The interrupts are then enabled and processing continues. As indicated by process block 524 a structure chart interpreter routine is then executed which, as will be described hereinafter, selects a ladder program file to execute. A ladder program interpreter routine 525 is then executed to run the selected ladder program file. After a single scan through the operative ladder program, and I/O scan is performed as indicated at process block 526.

Referring particularly to FIGS. 3 and 14, the I/O scan is performed on designated I/O racks. The output image 500 is written directly to the local I/O rack 1 and the input image 501 is updated by directly reading the local I/O rack 1. The other three, remote I/O racks 11, however, are updated by writing to and reading from the I/O image table 126 in the shared RAM 125. The I/O rack status words 610 are checked first to determine if an I/O rack is inhibited or has faulted, and when the outputs for a remote I/O rack 11 have been updated, its "N" bit in the status word 610 is set. Referring again to FIG. 10, after completion of the I/O scan the system flags 611 in the shared RAM 125 are checked, and if a mode change has taken place, the system branches at decision block 527. Otherwise, the system loops back to the structure chart interpreter 524 to select the next ladder program to run.

The manner in which the structure chart interpreter and the ladder program interpreter operate together to practice the present invention will now be described in detail.

Figure 11:
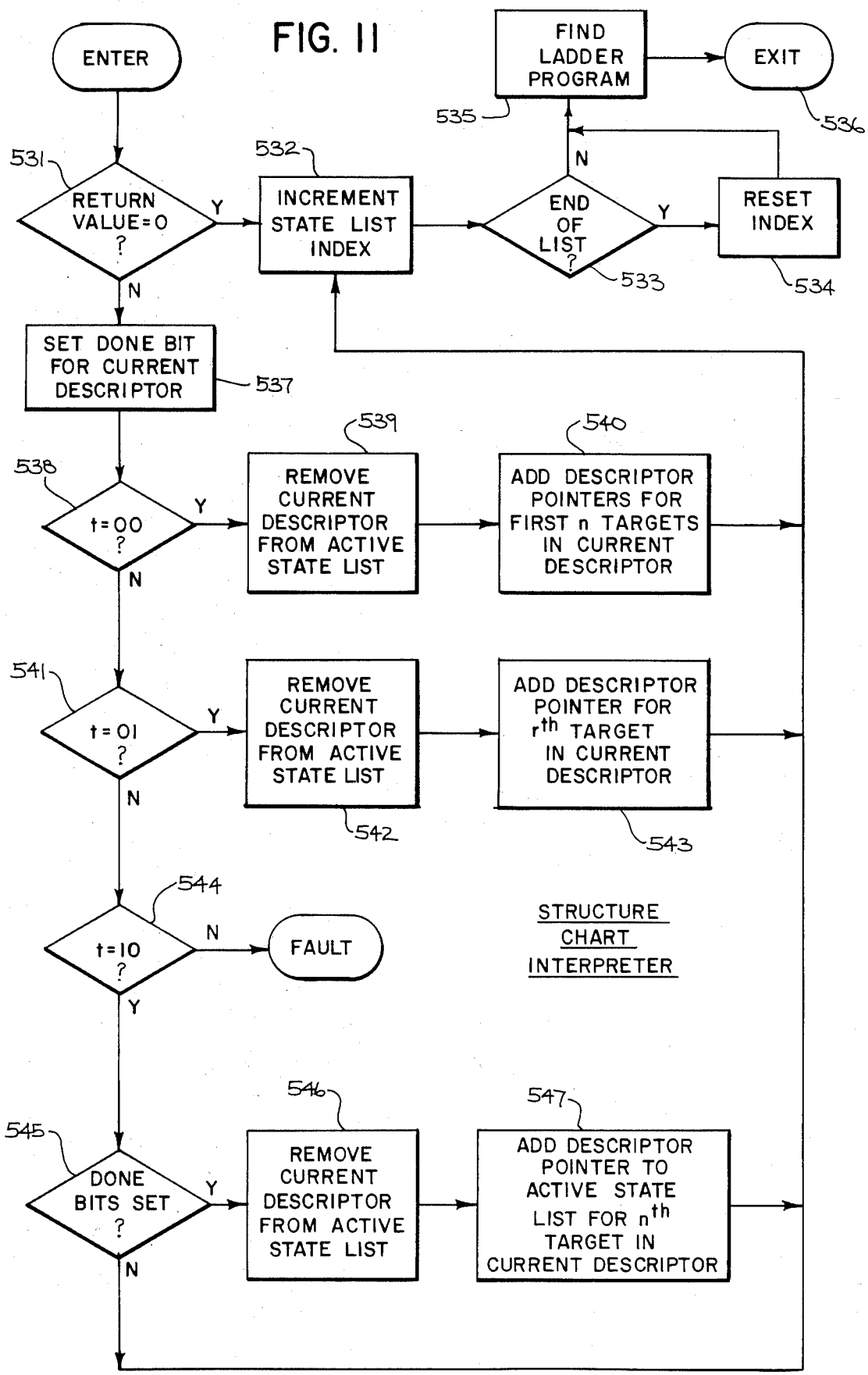
FIG. 11 is a flowchart of a structure chart interpreter program which forms part of the executive program of FIG. 10.

Referring particularly to FIGS. 11 and 12, when the structure chart interpreter is entered, a structure chart return value 530 (FIG. 9) is checked at decision block 531. This value is set by an "SCR" or "END" instruction at the completion of each ladder program. If the value is "0" this indicates that the ladder program has not completed its intended function and is to be scanned, or run, again. in such case, as indicated by process block 532, the active state list is not changed, but an index to the active state list 505 is incremented to the next descriptor pointer. If the end of the list 505 is reached, the system branches at 533 and the active state list index is reset to the top of the list 505 at process block 534.

As indicated at process block 535, the data structures in FIGS. 12A–12C are employed to locate the next ladder program to be executed. The descriptor pointer indicated by the active state list index is first used to locate the "currently active" descriptor 506 in the structure chart definition program file 504. As shown in FIG. 12B, the first word in the currently active descriptor 506 in turn indicates the file number of the ladder program which is now to be run. This program file number is used with the file directory (FIG. 6) to find the ladder program and load its starting address into the 16-bit microprocessor's ladder program counter. The structure chart interpreter then exits at 536 to the ladder program interpreter 525 as indicated above to begin executing the selected ladder program.

Referring to FIGS. 11 and 12, when a ladder program has completed its assigned function, it returns a value other than zero in the structure chart return value 530 (FIG. 9). As indicated by process block 537, when this occurs a "done bit" (D) is set in the active state list 505 for the currently active descriptor pointer. A series of tests are then made of the code in a "t" field in the first word of the currently active descriptor 506 to determine if a state change is to occur, and if so, to what. When the 2-bit t field is "00", as determined at decision block 538, a state change is to be made. The first step in making the indicated state change is to remove the currently active descriptor pointer from the active state list 505, as indicated at process block 539. New descriptor pointers are then added to the end of the active state list 505, as indicated by process block 540. The number of descriptor pointers to be added is indicated by the value of a 3-bit "n" field in the first word of the currently active descriptor 506, and the identity of the descriptor pointers to be added are indicated by target numbers stored in the currently active descriptor block 506. For example, if n=1, then the first target number is added to the active state list 505, whereas, if n=5, then the first five target numbers are added to the active state list 505. From one to seven separate ladder programs may thus be simultaneously activated by this state change. After making these changes, the structure chart interpreter loops to the process block 532 to activate the next descriptor 506 indicated by the active state list 505, and find and execute its ladder program.

If the t field in the currently active descriptor is "01", as indicated at decision block 541, a state change is also made. As indicated at process block 542, the descriptor pointer for the current descriptor is removed from the active state list 505, and another descriptor pointer is added to the end of the active state list 505, as indicated by process block 543. In this case the replacement descriptor pointer is determined by the return value (r) and the list of target numbers in the currently active descriptor 506. For example, if the ladder program returned a value r=3, then the third target number in the current descriptor 506 is loaded into the active state list 505. The t code "01" in a descriptor 506 thus enables a selected one of a plurality of ladder programs to be run after completion of the ladder program indicated in its own program file number field. The selection is made by the return value produced by the ladder program itself.

If the t code in the currently active descriptor is "10", as indicated by decision block 544, a "simultaneous convergence" of a plurality of active ladder programs is indicated. The ladder programs are specified for a simultaneous converge by the first n−1 target numbers stored in the current descriptor 506. For example, if the value of n in the current descriptor 506 is "4", then a t=10 state change will not occur until the ladder programs indicated by the first three target numbers have returned a non-zero value. As indicated at decision block 545, if the done bits (D) are not set in all of the specified, active state list entries, a state change is not performed. Instead, the structure chart interpreter merely loops back to the process block 532 to continue processing the ladder programs indicated by the entries in the active state list 505.

When the done bits have been set for each of the n−1 ladder programs indicated by the descriptor pointers in the active state list 505, the descriptor pointer for the current descriptor is removed from the active state list 505 as indicated by process block 546. Also, the other n−1 descriptor pointers are removed from the active state list 505. The nth target number in the current descriptor 506 is then added to the active state list 505, or in the above example, the fourth target number. This state transition occurs at process block 547 and then the structure chart interpreter loops to process the next ladder program indicated by the active state list 505.

Reference is made to Appendix D which is an assembly language listing of the structure chart interpreter routine.

Referring particularly to FIGS. 2, 10 and 13, when the structure chart interpreter 524 is exited, the ladder program to be run has been identified by loading its starting address into the ladder program counter is the 16-bit microprocessor 20. As indicated by process lock 550, the ladder program interpreter 525 is entered and the rung state register in the microprocessor 20 is initialized. The ladder program counter is also initialized to the first ladder program instruction, and the system enters a loop at process block 553 which writes the ladder program counter to the ladder program counter 40 in the bit processor 30 (FIG. 5A). The rung state register in the 16-bit microprocessor 20 is also written to the Boolean processor 445 (FIG. 5B) at process block 554, and the 16-bit microprocessor 20 puts itself into an inactive wait state by waking up the bit processor 30 at process block 555.

As explained above, the bit processor 30 maintains control and continues to execute ladder program instructions until it is either interrupted or until it encounters a ladder program instruction it cannot execute.

When the latter event occurs, the 16-bit microprocessor 20 is awakened and it resumes processing of the ladder program interpreter. More specifically, instructions indicted by process block 556 are executed to read the rung state of the Boolean processor 445 and the contents of the ladder program counter 40 in the bit processor 30. The system then fetches the indicated ladder program instruction at process block 551.

Referring still to FIG. 13, the operation code in the fetched ladder program instruction is mapped to the starting address of the proper interpreter program stored in the ROM 23 (FIG. 2) at process block 557. The 16-bit microprocessor 20 begins executing the instruction, and if the ladder program instruction is an "END" or "SCR" instruction as indicated at decision blocks 558 and 559, the ladder program is completed and control is returned to the exective (FIG. 10). Otherwise, the ladder instruction is executed by the proper interpreter routine, as indicated at process block 560, and the system loops back to process block 553 to pass control back to the bit processor 30 and to execute the next ladder program instruction.

Before returning to the executive, the ladder program interpreter writes a return value to the status data file 502 (FIG. 9). This is indicated at process block 561. The "END" ladder instruction writes a "0" for the return value. The "SCR" ladder instruction, however, includes an operand which is written to the status data file 502. Thus, the user's control program can determine the return value by controlling the value of the SCR instruction's operand. In addition, the SCR instruction operand also indicates which of the four I/O racks should be scanned. As indicated by process block 562, this "scan list" is ANDed with I/O rack status data and is written to the status data file 502 such that during the subsequent I/O scan (FIG. 10), only those I/O racks which nneed to be updated are updated. This reduces the overall scan time and improves the programmable controller's response to real time events.

The ladder instruction set executed by the control section 3A is similar to those disclosed in U.S. Pat. Nos. 4,266,281 and 4,442,504. As indicated above, the bit processor 30 executes some of these ladder instructions directly, whereas the remaining ladder instructions are executed by mapping to machine language interpreter routines stored in the ROM 23.

Appendix C provides an example machine to be controlled, an appropriate structure chart program, and example ladder programs. Such programs are created using the programming terminal 6 and communicated to the control section 3A.

Referring particularly to FIG. 2, the operation of the control section 3A is interrupted every ten milliseconds by the communications section 3C. When this occurs, control of the buses is given to the 16-bit microprocessor 20 and a ten millisecond interrpt service routine illustrated in FIG. 16 is executed. As indicated by process block 580 the state of the microprocessor's registers are saved in the RAM 35 and a watchdog timer is reset as indicated by process block 581. The real time clock used by the timer instructions is then updated at process block 582, and the control interrupt command 606 is read from the shared RAM 125 (FIG. 14), as indicated at process block 583. If the indicated command is one which should be executed imediately, the system branches at 584 and the command is executed at process block 585. In either case, the microprocessor registers are restored at process block 586 and the system returns to its interrupted task.

Referring particularly to FIGS. 3 and 4, the primary functions of the communications section 3C of the processor module 3 is to perform an I/O scan of the remote I/O racks 11 through the I/O channel 10, and to process commands which are received or transmitted through the serial channel 5. The microprocessor 205 carries out these functions in response to a scheduler program stored in the ROM 206 and a set of interrupt service routines, which are also stored in the ROM 206.

Figure 17:
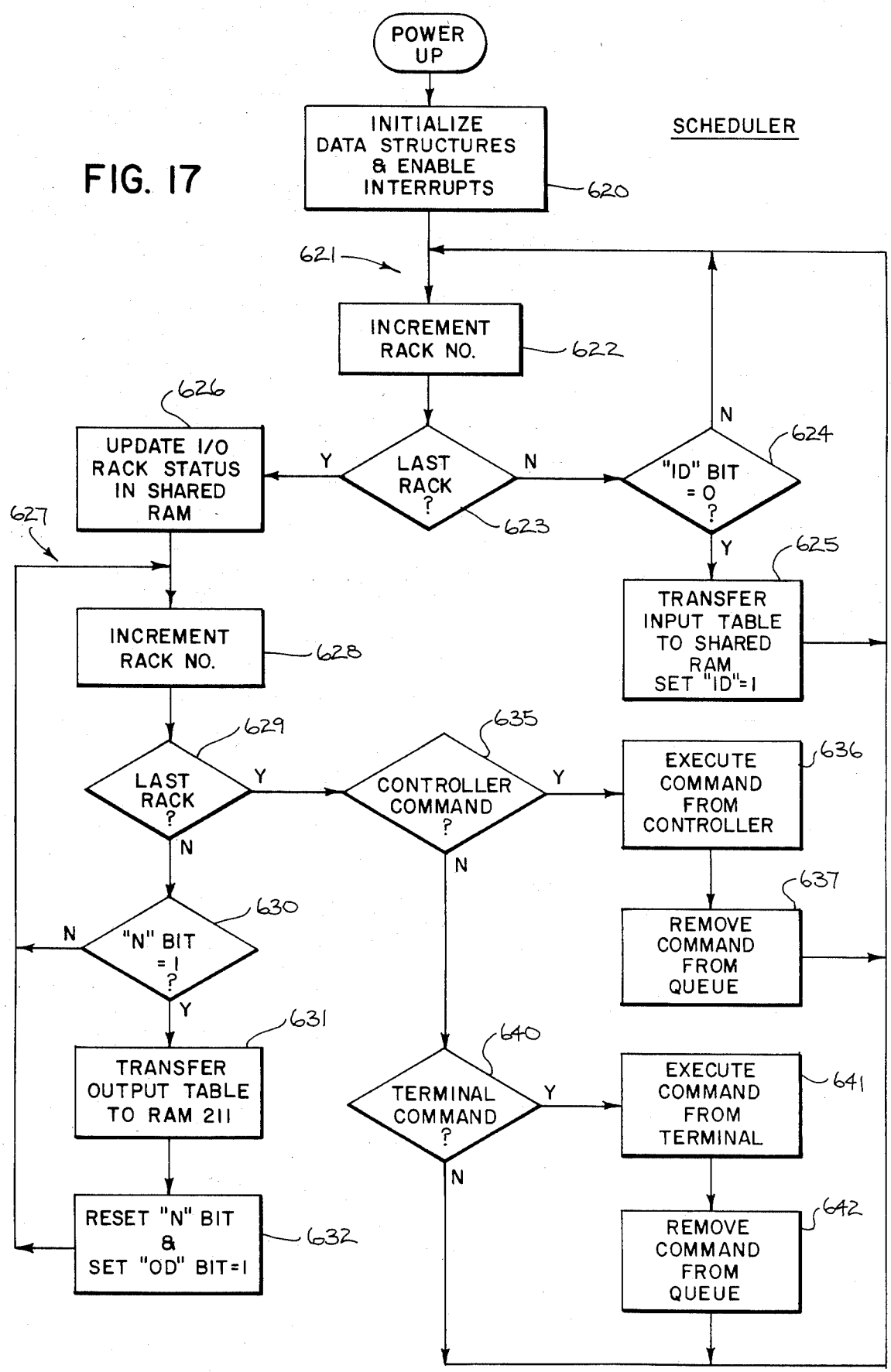
FIG. 17 is a flowchart of a scheduler program executed by the microprocessor in the communications section of FIG. 4.

Referring particularly to FIG. 17, the scheduler is entered at power up and a set of instructions are executed at 620 to initialize data structures in both the shared RAM 125 and the RAM 211. Interrupts are also enabled and a loop is entered at 621 to input data from each active remote I/O rack 11. The rack number is incremented at process block 622 and if the last I/O rack has not been examined, the scheduler branches at decision block 623 to check the "ID" bit in the I/O rack status 705 of the RAM 211 (FIG. 15). This bit is set to zero by the microcomputer 210 when its has updated the input image table 241A with the current status of input devices connected to the I/O rack 11, and when detected at decision block 624, this current input image is transferred from the RAM 211 to the corresponding locations in the input image table 126A of the shared RAM 125 (FIG. 14). This transfer is accomplished at process block 625 and the ID bit for the indicated I/O rack 11 is set to "1" before looping back to check the inputs from the next I/O rack 11. The input scan loop 621 thus updates the input image table 126A in the shared RAM 125 each time the microcomputer 210 reads a new set of inputs in from each remote I/O rack 11.

After scanning the inputs, the scheduler branches at decision block 623 to a set of instructions indicated by process block 626. These update the I/O rack status 610 n the shared RAM 125 (FIG. 14) with the current state indicated by the I/O rack status 705 in the RAM 211. For example, if an I/O fault was detect during the most recent input scan of I/O rack number two, this is indicated by the "F" bit for I/O rack number two. A loop is then entered at 627 in which the output image is transferred to the RAM 211 from the shared RAM 125. More specifically, the I/O rack number is incremented at 628 and if the last rack has not been checked, the scheduler branches at decision block 629 to check the "N" bit in the I/O rack status 610 of the shared RAM 125. If it is set to "1", as determined at decision block 630, the outputs for the indicated rack have been recently updated by the control section 3A. These updated outputs are transferred from the output image table 126B in the shared RAM 125 to the corresponding location in the output image table 241B of the RAM 211, as indicated at process block 631. The "N" bit is reset in the shared RAM 125, and the "OD" bit for the indicated I/O rack is set to "1" in the RAM 211 (FIG. 15) at process block 632. The scheduler then loops back to check the next I/O rack. When the loop 627 is exited at decision block 629, all outputs which have been updated by the control section 3A are passed on to the RAM 211 for transmission to the proper remote I/O rack 11.

Referring still to FIG. 17, after updating inputs and outputs, the scheduler checks the control command queue 706 in the RAM 211 to determine if any commands from the control section 3A require processing. If so, as determined at decision block 635, the indicated command is executed at process block 636 and the command is then removed from the queue 706 at process block 637. A typical command, for example, might be to transfer a responsive message in the output message buffer 607 of the shared RAM 125 (FIG. 14) to one of the fifteen buffers in the RAM 211 (FIG. 15).

If no controller commands are queued up, the program terminal queue 707 is checked at decision block 640. If a message has been received from the programming terminal 6, the appropriate command is executed at process block 641 and the command is then removed from the queue 707 at process block 642. Such a command might be, for example, to interpret data received from the terminal 6 and stored in one of the buffers 242 (FIG. 15) and to create a command which is passed on to the control section 3A through the input message buffer 605 in the shared RAM 125 (FIG. 14). Another command from the terminal 6 might be a request to change the mode of operation of the programmable controller. Such a command is executed by setting the appropriate system flag 611 (i.e. R, T or P) in the shared RAM 125.

It should be apparent that the scheduler operates as a conduit for information which is passing between the control section 3A and the serial ports 5 and 10. A set of interrupt routines are also executed by the microprocessor 205 to assist the scheduler in this task.

Figure 19:
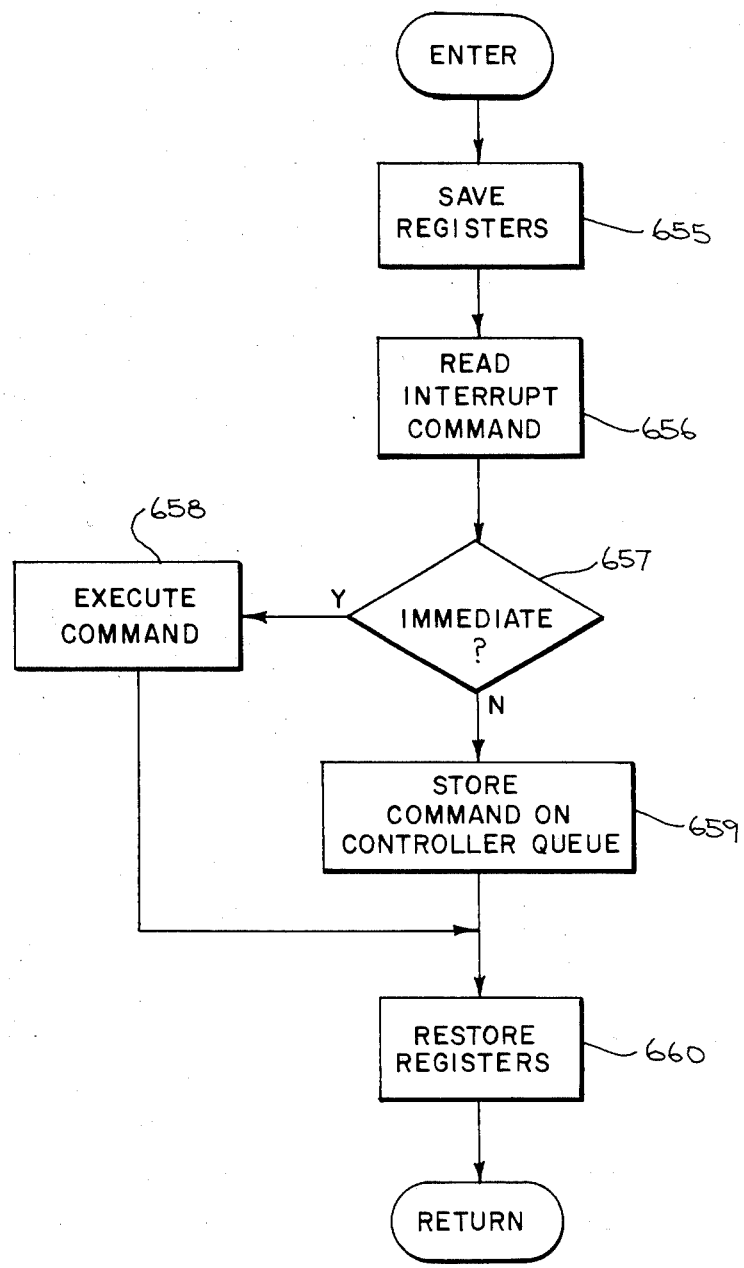
FIG. 19 is a flowchart of another interrupt service routine executed by the microprocessor in the communications section of FIG. 4.

The first of these is a ten millisecond interrupt service routine which is shown in FIG. 18. Referring to this and FIG. 4, the CTC 208 includes a timer which produces an interrupt every ten milliseconds and which vectors the microprocessor 205 to execute the routine of FIG. 18. As indicated by process block 645, the microprocessor's registers are saved in the RAM 211 and an interrupt command is written to the shared RAM 125, as indicated at process block 646. The control section 3A is then interrupted by writing to the output latch 130 (FIG. 3), as indicated by process block 647, and a watchdog timer is reset at process block 648. The microprocessor's registers are then restored at process block 649 and the system returns to the interrupted program. The interrupt command 606 (FIG. 14) includes a code which indicates to the control section 3A the function it is to perform during the servicing of the interrupt which this routine initiates every ten milliseconds. These functions include:

Diagnostic or Watchdog error—immediate
Reset Watchdog—immediate
Block transfer finished
Message ready in input buffer 605
Contact histogram data request A second interrupt of the microprocessor 205 may be produced by the control section 3A when it writes to the latch 130 (FIG. 3). When this interrupt occurs, the CTC 208 vectors the microprocessor 205 to an interrupt service routine shown in FIG. 19. The microprocessor 205 executes this routine by first saving its registers, as indicated by process block 655, and then reading the interrupt command 606 in the shared RAM 125 as indicated at 656. This interrupt command may indicate any of the following:

Diagnostic error—immediate
Block transfer request—immediate
Output message buffer ready If either of the immediate commands are detected, as determined at decision block 657, the indicated command is executed at process block 658. Otherwise, the data in the output message buffer 607 is transferred as a command to the controller command queue 706 in the RAM 211 (FIG. 15). This is accomplished at process block 659, and when completed, the microprocessor's registers are restored at 660 and the system returns from the interrupt. The scheduler program described above will process the transferred controller command further when time is available.

Yet another interrupt of the microprocessor 205 may be initiated by the microcomputer 210 (FIG. 4). When this occurs the CTC 208 vectors the microprocessor 205 to an interrupt service routine which merely records the fact that the serial channel 5 is inactive. Depending on the circumstances, this event may be interpreted as a fault. For example, if the control section 3A attempts to send a reply message to the programming terminal 6 and it has been disconnected, a fault is indicated.

As indicated above, the microcomputer 210 is programmed to operate as an "intelligent" DMA controller which handles input and output information flowing through the two serial ports 5 and 10. The microcomputer 210 is driven primarily by interrupts from the SCC 227, although it may also be interrupted by the microprocessor 205 when the latter diagnoses a fault condition which requires termination of all further transmissions.

Figure 20:
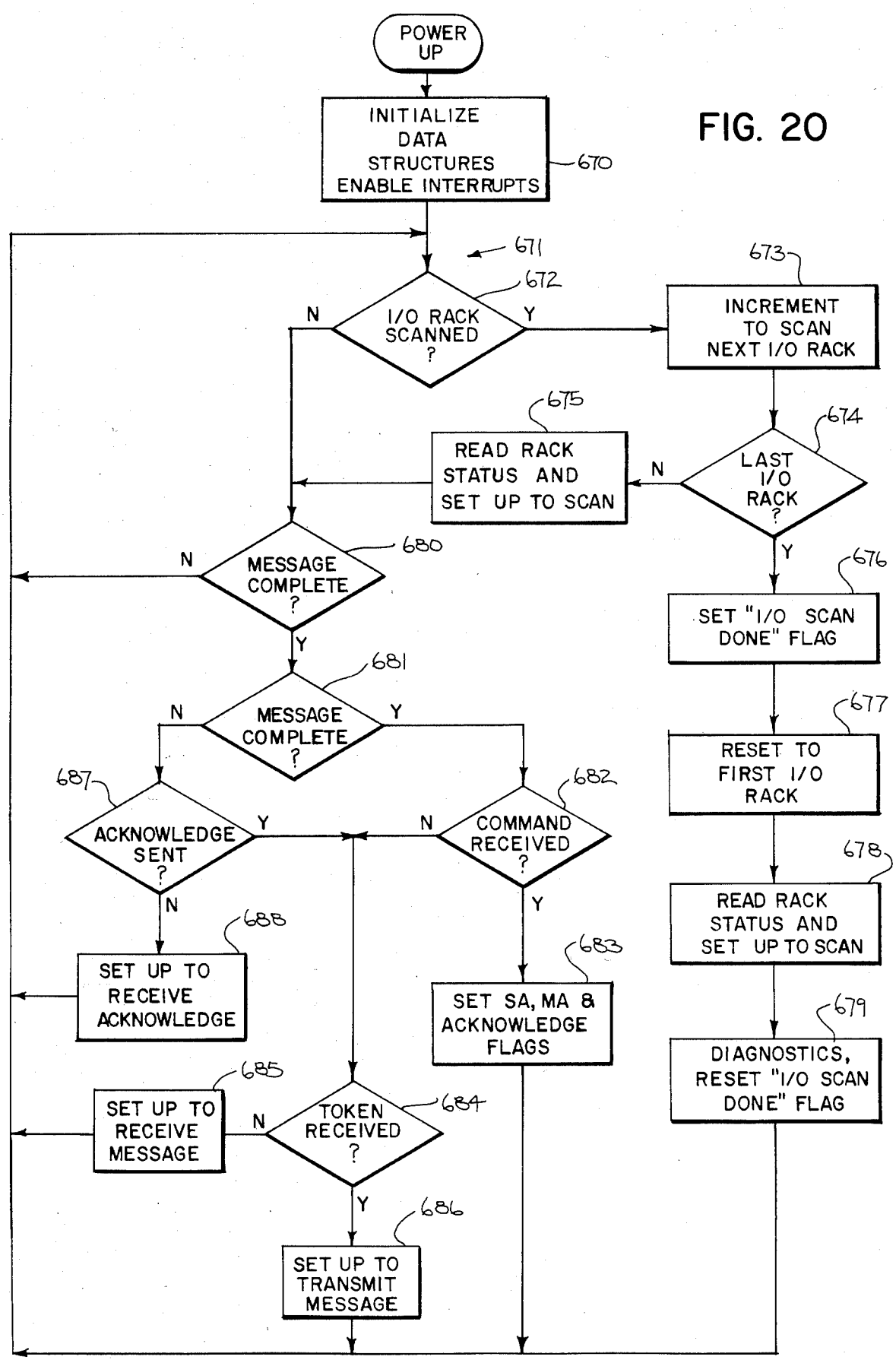
FIG. 20 is a flowchart of the main program executed by the microcomputer which forms part of the communications section of FIG. 4.

Although the microcomputer 210 is primarily interrupt driven, it does execute a main program which is illustrated in FIG. 20. When the system first powers up, a set of instructions are executed at process block 670 to initialize data structures and to enable interrupts. A loop is then entered at 671 in which checks are made to determine if an I/O rack has been completely scanned or if a message has been received or transmitted through the serial channel 5. Referring particularly to FIGS. 4, 15 and 20, an internal flag is checked at decision block 672 to determine if an I/O rack has been scanned. If so, pointers are set up to scan the next I/O rack 11 at process block 673, and a check is made at decision block 674 to determine if the last I/O rack has been scanned. If not, the system branches to process block 675 to read the I/O rack status 705 from the RAM 211 and to save it for use by the I/O scan interrupt service routine. Otherwise, an "I/O scan done" flag is set at 676 and the pointers are reset to scan the first I/O rack 11 at process block 677. The I/O rack status 705 is read from the RAM 211 and the I/O scan interrupt service routine is set to scan the first I/O rack 11, as indicated by process block 678. As indicated at process block 679, a number of diagnostic tests are then performed before resetting the "I/O scan done" flag and looping back to rescan the I/O racks.

Referring still to FIGS. 4, 15 and 20, after checking the status of I/O rack scanning, a check is made of an internal flag at decision block 680 to determine if the SCC 277 has completed the transmission or receipt of a message. If so, an internal receive/transmit flag is checked at decision block 681, and if a message was received, a check is made at decision block 682 to determine if a command or an acknowledgment was received. If a command was received, the "SA" and "MA" flags in the appropriate message buffer 242 are set along with an internal "acknowledge" flag, as indicated at process block 683. Otherwise, an internal "token" flag is checked at decision block 684 to determine if mastership of the serial link 5 has been given to the processor module 3. If not, the message interrupt service routine is set up to receive a message on the serial link 5 as indicated at process block 685. On the other hand, if the processor module 3 has been granted mastership, a set of instructions indicated at process block 686 are executed to locate any messages in the controller command queue 706 which are ready to be transmitted. If one is found, the message interrupt service routine is set up to transmit the message.

When a message has been transmitted, as determined at decision block 681, a test is made of the "acknowledge" flag at decision block 687 to determine if an acknowledgment has just been transmitted.

If so, the flag is reset and the system branches to decision block 684 to send or receive the next message. Otherwise, a command has been transmitted on the serial channel 5, and as indicated at process block 688, the message interrupt service routine is set up to await the acklowledgment from the other station on the link (i.e., the programming terminal 6).

Figure 21:
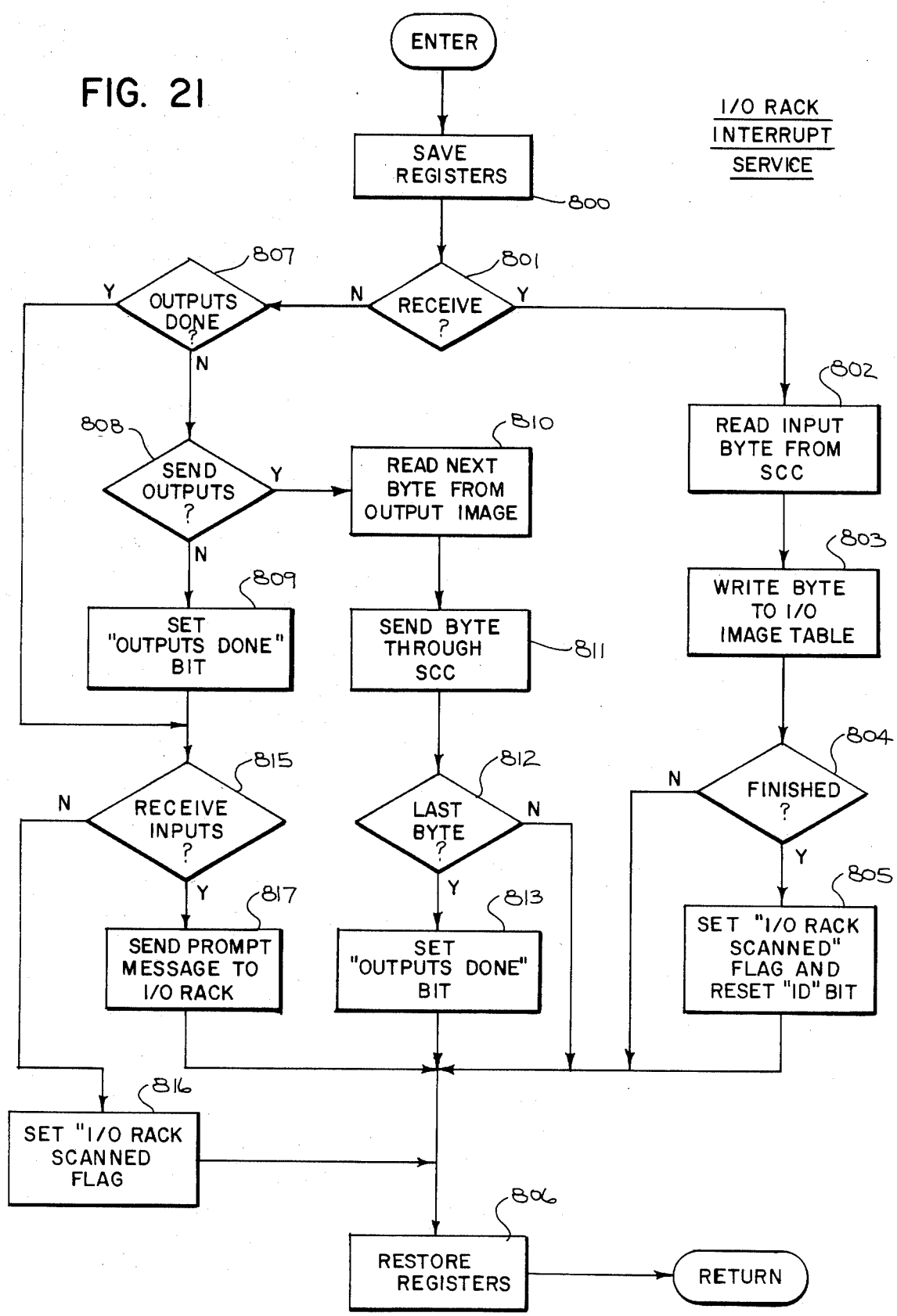
FIG. 21 is a flowchart of an I/O rack interrupt service routine which is executed by the microcomputer in the communications section of FIG. 4.

Referring particularly to FIGS. 4, 15 and 21, each time a character is received or transmitted through the remote I/O channel 10, the SCC 227 interrupts the microcomputer 210 and vectors it to an I/O rack interrupt service routine. When this routine is executed, the microcomputer's registers are saved at process block 800 and the routine branches at decision block 801 depending on whether a character has been received or transmitted.

When a character has been transmitted, the "outputs done" bit (OD) in the I/O rack status work 705 is checked at decision block 807 to determine if the last byte of output data has been sent. If not, other bits in the status word 805 are checked at decision block 808 to determine if the I/O rack is active. If not, the OD bit is set at process block 809, otherwise, a byte is read from the output image tableel 241B at process block 810 and delivered to the SCC 227 for transmission at process block 811. If the last byte for the current I/O rack was transmitted, as determined at decision block 812, the "OD" bit in the I/O rack status word 705 is set at 813 and the routine returns after restoring the microcomputer's registers at 806. In this manner the output image table 241B is transferred one byte at a time to the current I/O rack until all outputs in the I/O rack have been updated.

Referring still to FIGS. 21 and 15, after the outputs have been updated, as determined at decision block 807, a check is made of the "ID" bit in the I/O rack status word 705 at decision block 815. If this bit is reset, it indicates that the inputs are current and need not be updated. The ID bit is set by the microprocessor 205 as it executes the scheduler program (FIG. 17) to transfer the input image table 241A to the shared RAM 125 (FIG. 3). If there is no need to update the inputs, the "I/O rack scanned" flag is set at process block 816 and the system returns from the interrupt after restoring registers at process block 806. Otherwise, a prompting message is transmitted to the current I/O rack, as indicated at process block 817, and this causes the I/O rack to begin transmitting input data.

When a character is received, as determined at decision block 801, it is read from the SCC 227 at process block 802 and written to the appropriate location in the I/O image table 241A at process block 803. If the last byte has been received from the current I/O rack as determined at decision block 804, an "I/O rack scanned" flag and the ID bit in the I/O rack status word 705 are set at 805. In either case, the registers are restored at process block 806 and the system returns from the interrupt.

The microcomputer 210 thus operates to continuously update the input image 241A with input status data from the remote I/O racks 11. Similarly, it operates to continuously output data from the output image table 241B to the I/O racks 11 to keep the operating devices controlled by the programmable controller in the desired state.

Figure 22:
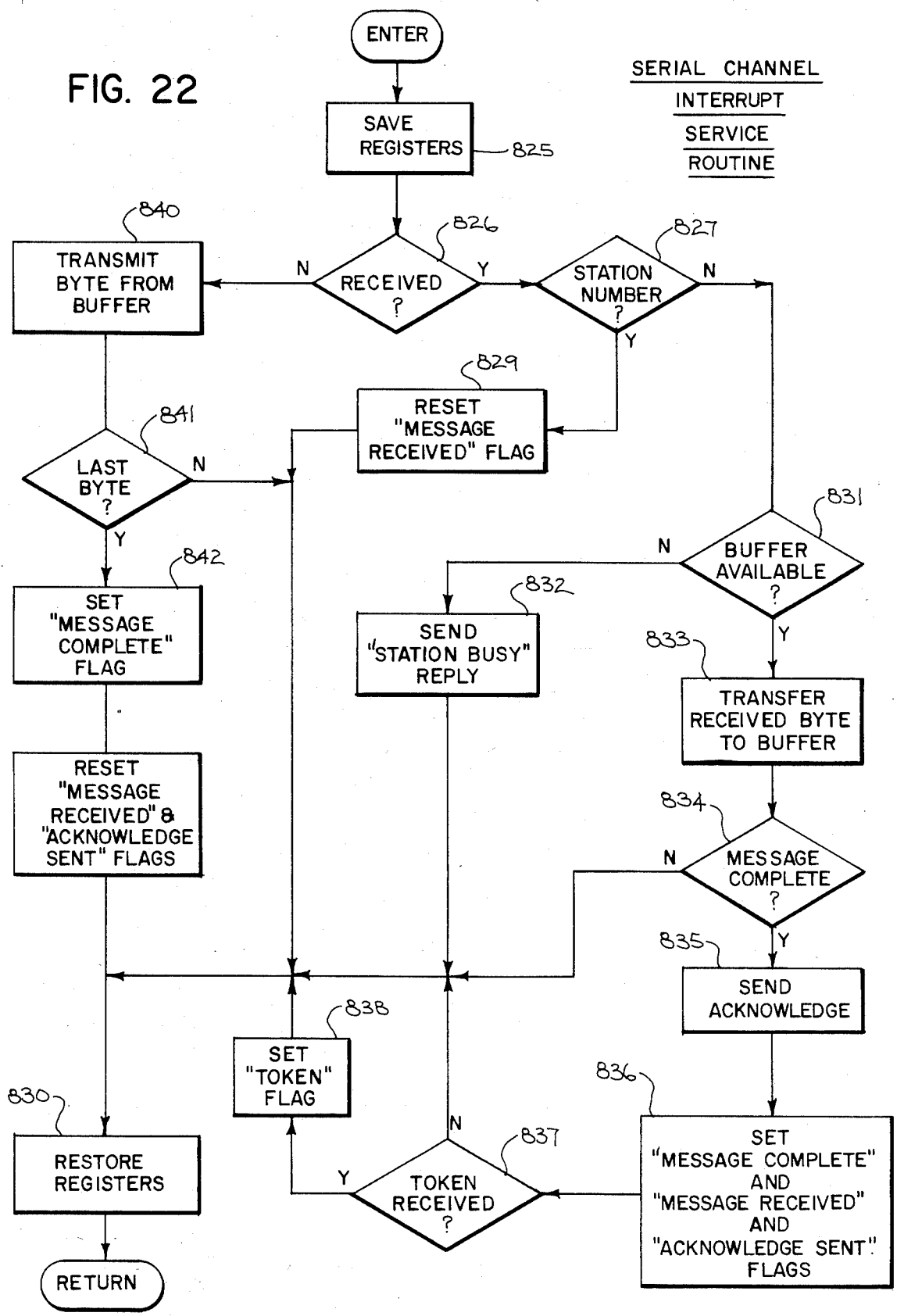
FIG. 22 is a flow chart of a serial channel interrupt service routine executed by the microcomputer in the communications section of FIG. 4.

Referring particularly to FIGS. 4, 15 and 22, when a byte of data is either transmitted or received through the serial channel 5, the SCC 227 interrupts the microcomputer 210 and vectors it to a serial channel interrupt service routine. When executed, the microcomputer's registers are saved at process block 825 and a determination is made at decision block 826 as to whether a character has been received or transmitted.

When a character has been received, a decision is made at block 817 as to whether the character is the destination station number or other data bytes in the message. If it is the destination station number and it corresponds to the station number setting on a set of DIP switches 828 connected to an input port of the microcomputer 210 (FIG. 4), then a "message received" flag is reset at process block 829 and the system returns from the interrupt after restoring the microcomputer's registers at process block 830. When the subsequent "originating" station number is received, the service routine branches at decision block 827 and a test is made at decision block 831 to determine if the message buffer 242 in the RAM 211 is available for that station. This is accomplished by testing the "SA" bit in the appropriate message buffer control byte, and if busy, a station busy message is sent back to the originating station, as indicated at process block 832. Otherwise, as subsequent data bytes in the message are received, they are transferred from the SCC 227 to the available message buffer 242, as indicated at process block 833. If the message has not been totally received, as determined at decision block 834, the registers are restored at 830 and the system returns to await receipt of the next byte in the message.

When the entire message has been received as determined at decision block 834, an acknowledge message is transmitted back to the originating station as indicated at 835. The "message complete", "message received" and "acknowledge sent" flags are all set at process block 836, and then a check is made at decision block 837 to determine if the programmable controller has been granted the network mastership token. If so, the "token" flag is set at 838, otherwise, the system returns from the interrupt through the process block 830.

Referring still to FIGS. 4, 15 and 22, when a character has been transmitted through the serial channel 5, the serial channel interrupt service routine branches at decision block 826 to process block 840. The instructions indicated by process block 840 direct the microcomputer 210 to read the next byte from the currently active message buffer 242 and write it to the SCC 227 for transmission through the serial channel 5. A test is made at decision block 841 to determine if the last byte in the message has been transmitted. If so, the "message complete" flag is set at process block 842 and the "message received" and "acknowledge sent" flags are reset. The system then returns from the interrupt through the process block 830.

A preferred embodiment of the invention has been described, but it should be apparent to those skilled in the art that many variations can be made without departing from the spirit of the invention. For example, there are many alternative means known in the art for updating the I/O image table with data from the I/O racks and for communicating with the programming terminal.

APPENDIX A

| Starting Address | Ending Address | Size | Element |
|---|---|---|---|
| Control Section Address Space | | | |
| 00000 | 0FFFF | 64K | ROM 23 |
| 10000 | 17FFF | 32K | Bit Processor 30 |
| E8000 | EFFFF | 32K | Shared buses 101, 102 |
| F2000 | FBFFF | 40K | RAM 35 |
| Communications Section Address Space | | | |
| 0000 | 3FFF | 16K | ROM 206 |
| 4000 | 5FFF | 8K | RAM 211 |
| 8000 | FFFF | 32K | Shared buses 101, 102 |
| Local I/O Section Address Space | | | |
| 8000 | FFFF | 32K | Request buses 101, 102 |
| BF00 | BF08 | | Input Multiplexor 131 |
| DF00 | DF07 | | Output Latch 130 |
| EF00 | EF3F | | I/O modules 4 |
| F000 | F7FF | 2K | Shared RAM 125 |

APPENDIX B

| Reference No. | Components Description |
|---|---|
| 16-bit microprocessor 20 | MC68008 microprocessor manufactured by Motorola Inc. |
| priority encoder 48 | 8-line-to-3-line priority encoder SN74LS148 manufactured by Texas Instruments. |
| decoder circuit 26 | 20L10 and 20 × 4 programmable array logic manufactured by Monolithic Memories Inc. |
| RAM 35, | 8K × 8 random access memory, serial No. HM6264LP manufactured by Hitachi |
| ROM 23 | 32K × 8 UV erasable PROM, serial No. 27256 manufactured by Intel |
| RAM 125 | 2K × 8 random access memory, Serial No. 6116 manufactured by Hitachi |
| bidirectional gates 104, 106, 216, 228, 136 | Bidirectional bus transceivers, Serial No. 74LS245 manufactured by Texas Instruments |
| gates 120, 103, 121, 105, 215, 236, 410, 411, 412, 424 | Three-state octal buffers and line drivers, Serial No. 74LS244 manufactured by Texas Instruments |
| 1 of 16 decoder 135 | Two 3-to-8 decoders serial No. 74LS138 manufactured by Texas Instruments |
| input multiplexor 131 | Two 8-bit multiplexors serial No. 74LS251 manufactured by Texas Instruments |
| output latch 130 | 8-bit addressable latch serial number 74LS259 manufactured by Texas Instruments |
| microprocessor 205 | 8-bit microprocessor serial No. Z8400 manufactured by Zilog Inc. |
| ROM 206 | 16K × 8 UV erasable PROM, serial No. 27128 manufactured by Intel |
| CTC 208 | Counter/timer circuit Serial No. Z8430 manufactured by Zilog |
| address latch 226 | Octal D-type transparent latch SN74LS373 manufactured by Texas Instruments |
| microcomputer 210 | Single chip microcomputer serial No. Z8611 manufactured by Zilog Inc. |
| SCC 227 | Serial input/output controller |

| Reference No. | Components Description |
|---|---|
| | Serial No. Z8030 manufactured by Zilog |
| ladder program counter 40 | Four 4-bit synchronous counters Serial No. 74LS161 |
| Real time counter 426 | Three BCD counters Serial No. 74LS192 and two binary counters Serial No. 74LS193 |
| Latches 420, 422 and 450 | Octal D-type transparent latch Serial No. 74LS373 |
| gates 458 and 459 | Gates with 3-state outputs Serial No. 74LS125 |
| Latch 440 | Octal D-type flip-flop serial No. 74LS273 |
| gates 457 | Octal buffers and line drivers Serial No. 74LS240 |
| 3 to 8 decoders 442 and Decoder/demultiplexor serial 456 | No. 74LS138 |
| 1 of 8 selector 452 | Data selector/multiplexor serial No. 74LS151 |
| 2 to 4 decoder 443 | Decoder/demultiplexor serial No. 74LS139 |

APPENDIX C STRUCTURE CHART PROGRAM

Figure 23:
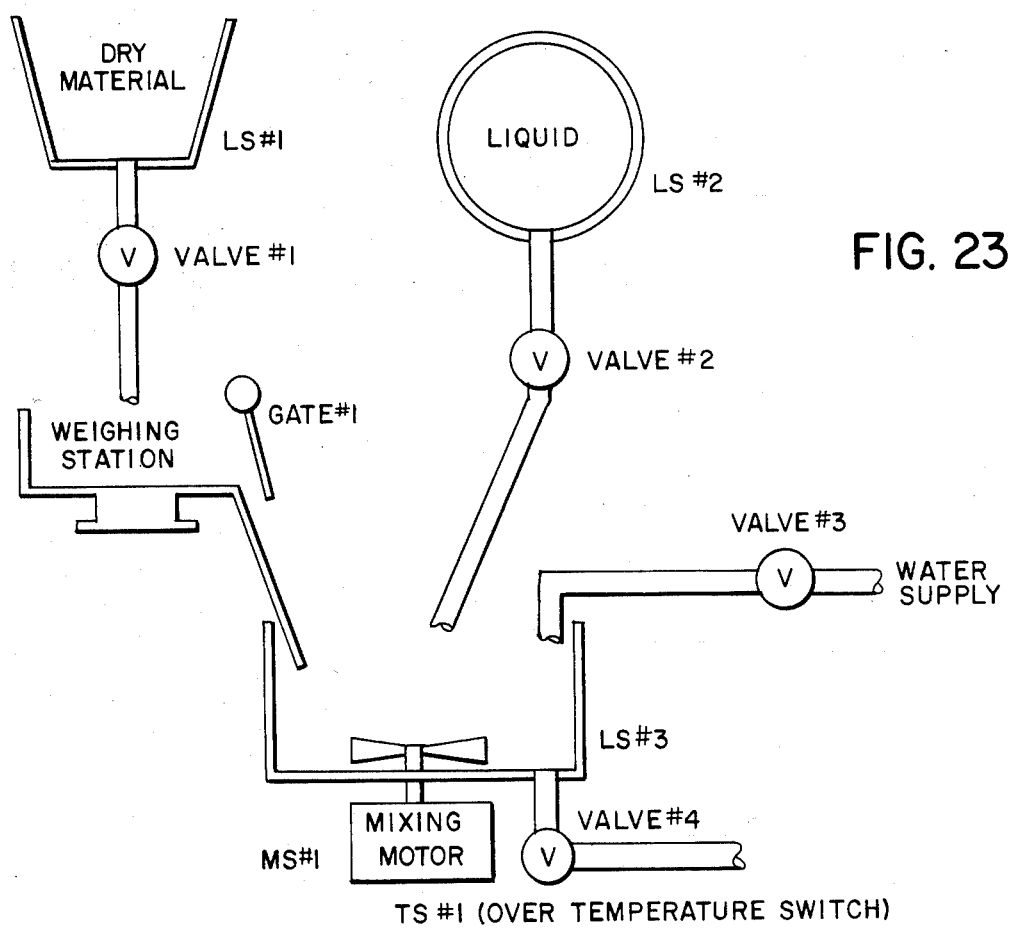
FIG. 23 is a pictorial representation of an example machine controlled by the programmable controller of FIG. 1.

The structure chart program described in this appendix is an example of a program which may be entered into the programmable controller using the programming terminal 6. This program will be described in connection with the process which is shown pictorialy in FIG. 23. Such a pictorial representation of the process being controlled by the programmable controller is typical of those displayed by high resolution color graphics terminals such as those sold by the Allen-Bradley Company under the trademark "Advisor". Stated simply, this example process weighs dry material, combines it with a liquid and water, mixes it, and dispenses the resulting product; or it washes the mixer with water.

Figure 24:
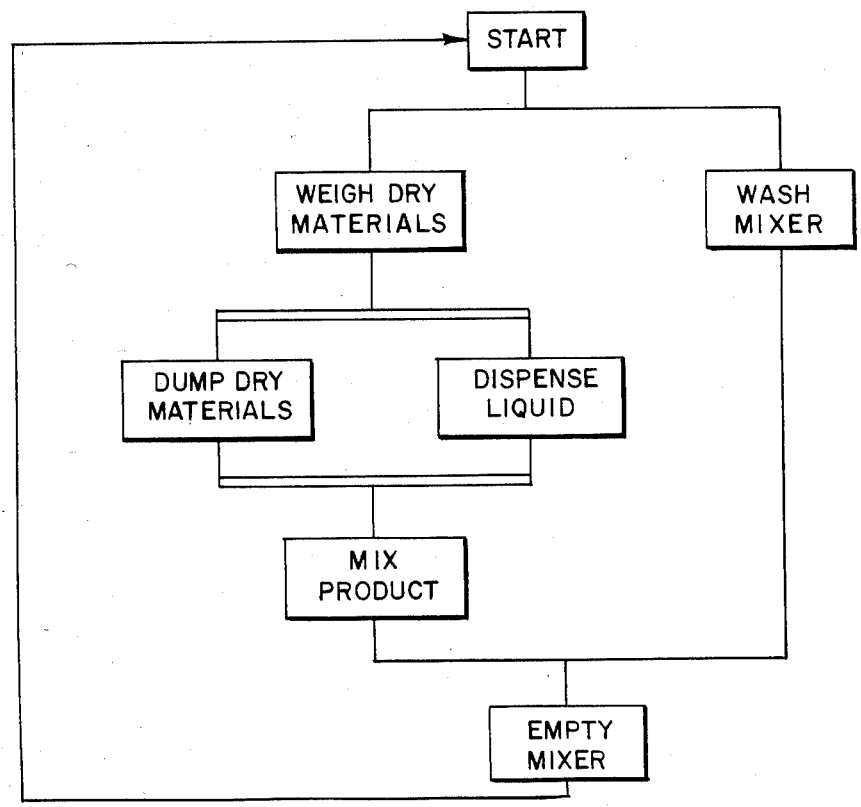

A function chart representation of this process is shown in FIG. 24. Each block in this chart represents a state, or step, and each block has a corresponding descriptor 506 which is stored in the structure chart definition 504 in the RAM 35. The resulting structure chart definition 504 is shown in FIG. 25. Note that descriptor #1 is a simultaneous diverge which causes both descriptors #3 and #4 to become active at the same time when ladder program stored as file #34 is completed.

Each structure chart definition indicates with its program file # a ladder program which is to be executed when the descriptor is listed on the active state list 505 (FIG. 12A). The following are graphic representations of these example ladder programs as they appear on the screen 8 of the programming terminal 6. These ladder programs are similar to those employed by numerous commercially available programmable controllers—with one important difference.

That difference is the "STRUCTURE RETURN" instruction which is required to pass appropriate parameters to the structure chart interpreter routine. The STRUCTURE RETURN is an "output" instruction in that it is only executed if the rung condition is true after executing the preceeding instructions on its rung. The operand of the STRUCTURE RETURN instruction identifies the return value which is employed by the structure chart interpreter routine and which identifies those I/O racks which should be scanned by the I/O scan routine after each scan through the ladder program (FIG. 10).

LADDER PROGRAM FILE #32

```
Function : START
|                                                    |
| LS #1                                       AL #1  |
+--]/[------------------------------------(L)--+    test for either
|                                                    of the raw material
| LS #2                                       AL #2 | hoppers being empty
+--]/[------------------------------------(L)--+
|                                                    |
| LS #3                                       AL #4 |
+--] [-------------------------------------(L)--+
|                                                    |
| TS #1                                       AL #3 |
+--] [-------------------------------------(L)--+
|                                                    |
| PB #3        AL #1    AL #2    AL #3    AL #4     |
+--] [----------(U)-----(U)-----(U)-----(U)--+
|                                                    |
| AL #1                                              |
+--] [----+--------- STRUCTURE RETURN --------+   if mixing unit is not
| AL #2   |               Return Value = #0    |   empty or temperature
+--] [----+               Scan Racks  0,1      |   switch is closed, or
| AL #3   |                                    |   no raw materials, do
+--] [----+                                    |   not let cycle start
| AL #4   |                                    |
+--] [----+                                    |
|                                              |
| PB #1                                        |
+--] [--------------- STRUCTURE RETURN --------+  select product cycle
|                         Return Value = #1    |
|                         Scan Racks  0,1      |
|                                              |
| PB #2                                        |
```

```
+--] [-------------- STRUCTURE RETURN -------+ select wash cycle
|                        Return Value = #2   |
|                        Scan Racks   0,1    |
|                                            |
+-------------------------------------(END)--+
LADDER PROGRAM FILE #34

Function : WEIGH DRY MATERIALS
|                                            |
| V #1                                  V #1 |
+--]/[---------------------------------(L)--+
|                                            |
|                                       V #1 |
+- GEQ ---------------+----------------(U)--+
| if WEIGHT >= 5      |                      |
|                     +- STRUCTURE RETURN ---+
|                        Return Value = #1   |
|                        Scan Racks   0,1    |
|                                            |
+-------------------------------------(END)--+
LADDER PROGRAM FILE #65

Function : WASH MIXER
|                                            |
+--------------------------------- TON #1 --+ fill mixer with water
|                                  5.0 sec  |
|                                           |
| T #1 timing                          V #3 |
+--] [--------------------------------( )--+
|                                           |
+--------------------------------- TON #2 --+ soak mixer
|                                  15.0 sec |
|                                           |
| T #2 timing                          V #4 |
+--] [--------------------------------( )--+ dump out waste water
|                                           |
| T #1 done   T #2 done                     |
+--] [--------] [------- STRUCTURE RETURN --+
|                        Return Value = #1  |
|                        Scan Racks   0,1   |
|                                           |
+------------------------------------(END)--+
LADDER PROGRAM FILE #24

Function : DUMP DRY MATERIALS
|                                           |
+--------------------------------- TON #3 --+
|                                  5.0 sec  |
|                                           |
|                                      G #1 |
+-------------------------------------( )--+ dump ingredients in
|                                           | weighing unit
| T #3 timing                               |
+--]/[------------------- STRUCTURE RETURN -+
|                        Return Value = #1  |
|                        Scan Racks   0,1   |
|                                           |
+------------------------------------(END)--+
LADDER PROGRAM FILE #39

Function : DISPENSE LIQUID
|                                           |
+--------------------------------- TON #4 --+  add liquid
|                                  8.0 sec  |
|                                           |
| T #4 timing                          V #3 |
```

```
+--] [------------------------------( )--+
|                                        |
| T #4 done                              |
+--] [------------------ STRUCTURE RETURN ----+
|                         Return Value = #1  |
|                         Scan Racks    0,1  |
|                                        |
|                                        |
+----------------------------------(END)---+
```
LADDER PROGRAM FILE #7

Function : MIX PRODUCT

```
|                                        |
+------------------------------- TON #5 -+  mixer runs for
|                                45.0 sec|
|                                        |     45 sec
| T #5 timing    TS #1           MS #1   |
+--] [-----------]/[-------------------(L)--+
|                                        |
| TS #1                       MS #1 AL #3|
+--] [----------------+--------(U)----(L)--+
|                     |                  |
|                     +-- STRUCTURE RETURN ----+
|                         Return Value = #0  |
|                         Scan Racks    0,1  |
|                                        |
| T #5 done                      MS #1   |
+--] [----------------+--------(U)------------+
|                     |                  |
|                     +-- STRUCTURE RETURN ----+
|                         Return Value = #1  |
|                         Scan Racks    0,1  |
|                                        |
+---------------------------------(END)---+
```
LADDER PROGRAM FILE #12

Function : EMPTY MIXER

```
|                                        |
| LS #3                          V #4    |
+--] [-------------------------------( )--+
|                                        |
| LS #3                                  |
+--]/[------------------ STRUCTURE RETURN ----+
|                         Return Value = #1  |
|                         Scan Racks    0,1  |
|                                        |
+----------------------------------(END)---+
```

<u>Appendix D</u>

Structure Chart Interpreter

```
        bclr    #turnon,SC_flags       ;did power just come on?
        bne     powerupstart           ;yes, jump
        bclr    #loadtorun,SC_flags    ;is mode changing from load to run?
        bne     cold_start             ;yes, jump
        bra     what_to_do powerupstart:
        btst    #SC_startover,SC_STATUS ;do we start where left off?
        bne     powerup_continue        ;yes, jump
cold_start:
        movea.l #SC_state_list, a0     ;clear out state list
        movea.l #15,d0                 ;(-1 for dbf)
loopa:  clr.w   (a0)+
        dbf     d0,loopa
```

```
            move.w   #SC_first,SC_state_list   ;set first pass flag and desc num 0
            bclr     #dosingfunc,SC_flags      ;is this a single function GPL request?
            beq      powerup_continue          ;no, jump
sing_func:
            move.w   SC_sing,SC_state_list     ;put function descripter number on list
powerup_continue:
            move.l   #SC_state_list,SC_running_state ;set active pointer to first entry
            move.l   SC_running_state,a1       ;get running state
            clr.w    SC_RET_VAL                ;clr ret val
            bra      continue_on2 what_to_do:
            move.l   SC_running_state,a1       ;a1 = pointer
            bclr     #SC_first_bit,(a1)        ;clear first scan flag in list
            tst.w    SC_RET_VAL                ;is this function complete?
            beq      continue_on               ;no, jump
            move.w   (a1),d1                   ;d1 = descripter number (function num)
            and.w    #SC_desc_msk,d1           ;save desc number
            ori.w    #SC_done,(a1)             ;set done bit
            move.w   #1,d0                     ;d0 = descripter file number
            bsr      UP_ADDR_OF                ;a0 = address of that descripter
            cmpa.l   #0,a0                     ;check that a valid address is returned
            beq      addr_error                ;if no valid address, jump
            move.w   (a0),d0                   ;get first word of descripter
            and.w    #SCD_num_follow,d0
            rol.w    #5,d0                     ;d0 = number of following states
            tst.w    d0                        ;is nnn valid i.e. not zero
            beq      nothing_to_do             ;no, jump
            move.w   (a0),d1                   ;get first word of descripter
            and.w    #SCD_path_type,d1         ;d1 = type of "path" (tt)
            beq      do_em_all                 ;in-line sequencing? yes, jump
            cmpi.w   #SCD_do_one,d1            ;one of n selection?
            bne      is_they_done              ;no, jump ;one of n selection
do_one:     bsr      remove_entry              ;one of n selection, remove this func.
            cmp.w    SC_RET_VAL,d0             ;are there enough nnns
            bge      val_ok                    ;yes, jump
            move.w   d0,SC_RET_VAL             ;make ret val to select last function
val_ok:     move.w   SC_RET_VAL,d3             ;d3 = scr return value
            add.w    d3,d3                     ;double for word index
  wi move.w 0(a0)[d3],(a1)                     ;load in next function to end of list
            move.w   0(a0)[d3],(a1)
            .byte fix
            ori.w    #SC_first,(a1)            ;set first pass flag
            bra      continue_on               ;continue
;simultaneous diverge, or in-line sequence, or one of n converge
do_em_all:
            bsr      remove_entry              ;remove this function
            tst.w    d0                        ;are there any nnns?
            ble      continue_on               ;no, jump
            adda.l   #2,a0                     ;a0 = first following function number loopd:      cmpa.l   SC_state_list+32,a1       ;is there enough room for nnns?
            blt      no_space                  ;no, jump
            move.w   (a0)+,(a1)                ;copy descripter nums to list entries
            ori.w    #SC_first,(a1)+           ;set flags
            suba.w   #1,d0                     ;are there any more nnn's to move?
            bgt      loopd                     ;yes, jump
            bra      continue_on               ;continue
;simultaneous converge
is_they_done:
            movea.l  #SC_state_list,a4         ;a4 = address of list
            clr.l    d4                        ;d4 = counter
            suba.w   #1,d0                     ;nnn-1 to check for done
            move.l   SC_running_state,-(a7)    ;save address of this entry
            adda.l   #2,a0                     ;a0 = addr of first following function
```

```
loopf:      adda.w    #1,d4
            cmp.w     d4,d0                       ;any more to check?
            blt       clear_em                    ;no, jump....we are at the end of the
                                                  ; nnns and the last func should start
            move.w    #15,d5                      ;load count of number of entries in list
            move.w    (a0)+,d6                    ;get nnn'th following state into d6
            ori.w     #SC_done,d6                 ;set done and valid bit
loope:      cmp.w     (a4)+,d6                    ;search list for that entry being done
            dbeq      d5,loope                    ;loop if not found or not at end of list
            move.l    a4,-(a7)                    ;save address of this entry
            cmpi.w    #-1,d5                      ;if we found it
            bne       loopf                       ;jump, try to find new nnn in list
loopi:      move.l    (a7)+,a1                    ;didnt find entry, clear out saved list
            dbf       d4,loopi                    ;jump if not clear yet
            move.l    (a7)+,a1                    ;didnt find entry, clear out saved list
            bra       continue_on                 ;jump clear_em:
            suba.w    #2,d4                       ;correct d4, -1 for dbf, -1 for 1st ent-
loopj:      move.l    (a7)+,a1                    ;recall saved things to clear
            clr.w     -2(a1)                      ;entry to clear is previous
            dbf       d4,loopj                    ;jump if more to clear
            move.l    (a7)+,a1                    ;get this list entry
            bsr       remove_entry                ;remove this function
            move.w    (a0),(a1)                   ;place last func num on list
            ori.w     #SC_first,(a1)              ;set first user pass flag
            move.l    #SC_state_list,a1           ;start at top of list (a1 source addr)
            move.l    a1,a3                       ;(a3 is dest addr)
loopq:      cmpa.l    SC_running_state,a1         ;is this the running one?
            bne       not_r                       ;no, jump
            move.l    a3,SC_running_state         ;correct running state
not_r:      move.w    (a1)+,d0                    ;check entry
            beq       skip                        ;if zero dont copy, jump
            move.w    d0,(a3)+                    ;copy
            clr.w     -2(a1)                      ;clear out old spot
skip:       cmpa.l    #SC_state_list+32,a1        ;at end?
            ble       loopq                       ;no, jump back
            movea.l   SC_running_state,a1
            bra       continue_on2                ;jump
continue_on:
            movea.l   SC_running_state,a1         ;get address of current list entry
            adda.l    #2,a1                       ;increment to next list entry
continue_on2:
            cmpa.l    #SC_state_list+32,a1        ;is pointer past end of list?
            bgt       start_at_top                ;yes, jump
            tst.w     (a1)                        ;is there an entry here?
            bne       found_next                  ;yes, jump
start_at_top:
            movea.l   #SC_state_list,a1           ;start over again at top of list
            tst.w     (a1)                       ;is there an entry here?
            beq       nothing_to_do               ;no, jump
found_next:
            move.l    a1,SC_running_state         ;save address of next running entry
            btst      #SC_first_bit,(a1)          ;is first user pass bit set?
            beq       no_set_1st                  ;no,jump
            bset      #SC_p1_flag,SC_STATUS       ;set 1st pass bit in status section of o
            bra       clr_ret_val                 ;jump
no_set_1st:
            bclr      #SC_p1_flag,SC_STATUS       ;reset 1st pass bit in status section
clr_ret_val:
            clr.w     SC_RET_VAL                  ;reset scr return value ;inputs:
;       a1.l = address in list of one to remove
;output:
;       a1.l = address of next open spot
;*************************************************************************
remove_entry:
            cmpa.l    #SC_running_state,a1        ;is this the running state?
            bne       remv                        ;no, jump
            suba.l    #2,SC_running_state         ;point running state at previous entry
```

```
remv:   cmpa.l    #SC_state_list+32,a1    ;are we at end of list?
        bge       remove_done             ;yes, jump
        move.w    2(a1),(a1)+             ;move next spot into this spot
        bne       remove_entry            ;was the next spot clear? no, jump
        subq.l    #2,a1                   ;correct address
        rts                               ;done
remove_done:
        clr.w     (a1)                    ;clear it out
        rts                               ;done

.END
```

We claim:

1. A programmable controller for operating a machine to carry out a plurality of programmed functions, which comprises:
   a memory which stores a user control program comprised of a plurality of ladder programs that each include a plurality of instructions which direct the programmable controller to operate the machine to perform a specific function, and a structure chart program that determines the sequence in which the plurality of ladder programs are to be executed to thereby control a machine connected to the programmable controller;
   processor means coupled to the memory and being operable to execute the use control program and to thereby perform the functions indicated by the ladder programs, said processor means including:
   means coupled to the memory for interpreting the structure chart program to produce an active state list which is stored in said memory and which indicates the order in which the ladder programs are to be executed; and
   means coupled to the memory for reading the stored active state list and for executing the ladder programs indicated by the active state list by reading the ladder program instructions from the memory and carrying out the functions indicated thereby to operate the machine.

2. The programmable controller as recited in claim 1 in which the means for interpreting the structure chart program is operable after the means for executing the indicated ladder programs has executed the instructions in a ladder program to determine: if the executed ladder program is to be removed from the stored active state list; and if other ladder programs are to be added to the stored active state list.

3. The programmable controller as recited in claim 2 in which the stored structure chart program is comprised of a plurality of structure chart definitions and each structure chart definition includes a program file number which identifies a ladder program associated with the structure chart definition, and a target number which identifies another ladder program that is to be placed on the stored active state list when said associated ladder program is removed from the stored active state list.

4. The programmable controller as recited in claim 3 in which each structure chart definition includes a plurality of target numbers which identify a corresponding plurality of other ladder programs, and each structure chart definition includes a code which is employed by the means for interpreting the structure chart program to select one of said plurality of target numbers when said associated ladder program is removed from the stored active state list.

5. In a programmable controller which includes a memory for storing a user control program and a processor for executing the user control program to direct the operation of a machine connected to the programmable controller through a sequence of states, the method comprising:
   storing a structure chart program in the memory which defines the sequence of states;
   storing the user control program in the memory as a plurality of ladder programs, each of which ladder program includes a set of ladder program instructions that indicate the functions which the machine is to perform when the instructions are executed by the processor, and another ladder program instruction that indicates that the machine is to change to another of its states when said another ladder program instruction is executed by the processor;
   processing the stored structure chart program, the steps comprising:
   (a) selecting a stored ladder program which is associated with the indicated current state of the machine;
   (b) processing the selected ladder program to operate the machine by reading the ladder program instructions therein from the memory and executing them with the processor;
   (c) indicating a change in the current state of the machine and de-selecting the selected ladder program when a state change is indicated by said another ladder program instruction during its processing; and
   (d) repeating steps (a), (b) and (c).

6. The method as recited in claim 5 in which the processing of the selected ladder program includes repeatedly executing the ladder program instructions in the selected ladder program until a state change is indicated by the execution of said another ladder program instruction and the ladder program is de-selected.

7. The method as recited in claim 5 in which
   an active state list is stored in the memory which indicates the current state of the machine and which stores indicators that identify those stored ladder programs which are associated with the current state of the machine; and in which the processor changes the stored active state list when a state change is indicated during the processing of a selected ladder program; in which the ladder program to be processed is selected from those ladder programs indicated by the stored active state list; and in which a ladder program is de-selected by removing its indicator from the active state list.

8. The method as recited in claim 7 in which a structure chart definition is stored in the memory for each ladder program, and in which each structure chart definition stores a file number that identifies the ladder program with which the structure chart definition is associated, and a target number that indicates another stored ladder program which is to be added to the active state list when the associated ladder program is de-selected.

9. The programmable controller as recited in claim 1 in which the data bus has a plurality of leads of the operation codes in said second operation code set direct the execution of single-bit oriented operations, and the bit processor includes:

bit select means coupled to the data bus and being operable in response to a bit pointer code in the fetched ladder program instruction operation code to select one of the leads in the data bus;

a Boolean processor connected to the bit select means and being operable in response to the operation code in the fetched ladder program instruction to perform a logical operation using the logic signal on the selected lead in the data bus or to produce a logic output signal on said selected data bus lead.

* * * * *